US010359850B2

United States Patent
Endo et al.

(10) Patent No.: US 10,359,850 B2
(45) Date of Patent: Jul. 23, 2019

(54) APPARATUS AND METHOD FOR SWITCHING VIBRATION AT PANEL SURFACE

(71) Applicant: FUJITSU LIMITED, Kawasaki-shi, Kanagawa (JP)

(72) Inventors: Yasuhiro Endo, Ebina (JP); Noriyasu Vontin, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 26 days.

(21) Appl. No.: 15/722,963

(22) Filed: Oct. 2, 2017

(65) Prior Publication Data

US 2018/0024637 A1     Jan. 25, 2018

Related U.S. Application Data

(63) Continuation of application No. PCT/JP2015/061128, filed on Apr. 9, 2015.

(51) Int. Cl.
*G06F 3/01* (2006.01)
*G06F 3/041* (2006.01)
(Continued)

(52) U.S. Cl.
CPC .............. *G06F 3/016* (2013.01); *G06F 3/041* (2013.01); *G06F 3/0416* (2013.01);
(Continued)

(58) Field of Classification Search
CPC ......... G06F 3/041; G06F 3/016; G06F 3/0416
See application file for complete search history.

(56) References Cited

U.S. PATENT DOCUMENTS

| 7,251,782 B1 * | 7/2007 | Albers | .................. | G06F 3/0481 |
| | | | | 715/708 |
| 2009/0292990 A1 * | 11/2009 | Park | .................. | G06F 3/016 |
| | | | | 715/702 |

(Continued)

FOREIGN PATENT DOCUMENTS

| EP | 2124131 | 11/2009 |
| JP | 2002-279100 | 9/2002 |

(Continued)

OTHER PUBLICATIONS

Giraud et al., "Using an ultrasonic transducer to produce tactile rendering on a touchscreen", 2014, IEEE (Year: 2014).*

(Continued)

*Primary Examiner* — Li P Sun
(74) *Attorney, Agent, or Firm* — Maschoff Brennan

(57) ABSTRACT

A drive controlling apparatus drives a vibrating element of an electronic device, the electronic device including a display part, a top panel having a manipulation surface, a coordinate detector configured to detect coordinates of a manipulation input. The drive controlling apparatus includes: a storage part configured to store image data for a scrollable image, to be displayed on the display part and including an input field, in association with position data that represents a position of the input field in the image and input data input in the input field; and a drive controlling part configured to drive the vibrating element according to a first pattern when the input field without the deficiency is being displayed on the display part and to drive the vibrating element according to a second pattern when the input field with the deficiency is not being displayed on the display part.

14 Claims, 21 Drawing Sheets

(51) Int. Cl.
*G06F 3/0485* (2013.01)
*G06F 3/0488* (2013.01)
*H04M 19/04* (2006.01)

(52) U.S. Cl.
CPC .......... *G06F 3/0485* (2013.01); *G06F 3/0488* (2013.01); *H04M 19/04* (2013.01); *G06F 2203/014* (2013.01); *G06F 2203/04809* (2013.01)

(56) References Cited

U.S. PATENT DOCUMENTS

| | | |
|---|---|---|
| 2013/0141378 A1 | 6/2013 | Yumiki et al. |
| 2014/0176455 A1 | 6/2014 | Araki |
| 2016/0209979 A1 | 7/2016 | Endo et al. |

FOREIGN PATENT DOCUMENTS

| | | |
|---|---|---|
| JP | 2004-341951 | 12/2004 |
| JP | 2013-126140 | 6/2013 |
| JP | 2013-143080 | 7/2013 |
| WO | 2012/169176 | 12/2012 |
| WO | 2015/045063 | 4/2015 |

OTHER PUBLICATIONS

Takeyuki Dohda et al., "The Printed-matter Typecasting Method for Haptic Feel Design and Sticky-band Illusion", the Collection of papers of the 11th SICE system integration division annual conference (SI2010, Sendai), Dec. 2010, pp. 174 to 177, Abstract.

Masashi Nakatani et al., "The Fishbone Tactile Illusion", Collection of papers of the 10th Congress of the Virtual Reality Society of Japan, Sep. 2005.

International Search Report of Int. Appl. No. PCT/JP2015/061128 dated Jun. 23, 2015.

Extended European Search Report dated Mar. 12, 2018 issued with respect to the corresponding European Patent Application No. 15888497.3.

* cited by examiner

FIG.9

| APPLICATION ID | IMAGE DATA | INPUT FIELD COORDINATE DATA | INPUT DATA |
|---|---|---|---|
| ID1 | image_1 | f1=(U,V) | data_1 |
| ID2 | image_2 | f2=(U,V) | data_2 |
| ID3 | image_3 | f3=(U,V) | data_3 |
|  |  |  |  |

FIG.10

| DISPLAYED CONTENT AT TIME OF SCROLLING OPERATION | VIBRATION PATTERN |
|---|---|
| WHEN INPUT FIELD WITHOUT DEFICIENCY IS WITHIN DISPLAY AREA | P1 |
| WHEN INPUT FIELD WITH DEFICIENCY IS WITHIN DISPLAY AREA | P1 |
| WHEN INPUT FIELD WITH DEFICIENCY IS NOT WITHIN DISPLAY AREA | P2 |

APPARATUS AND METHOD FOR SWITCHING VIBRATION AT PANEL SURFACE

CROSS-REFERENCE TO RELATED APPLICATION

This application is a continuation application of International Application PCT/JP2015/061128 filed on Apr. 9, 2015 and designated the U.S., the entire contents of which are incorporated herein by reference.

FIELD

The embodiments discussed herein relate to a drive controlling apparatus, an electronic device, a computer-readable recording medium, and a drive controlling method.

BACKGROUND

Conventionally, there exists an input support apparatus that includes a display unit, an input unit, and a control unit that outputs, to the display unit, information input in the input unit. The input support apparatus includes a unit that outputs a key input screen having transparency to the display unit on a front surface layer when the control unit detects a selection of an input field on an input screen output by the display unit. The input support apparatus further includes a unit that displays a character based on a key selected in the key input screen, and a unit that completes, when determining the input to the input field is completed, outputting the character input to the input field and completes outputting the key input screen to the front surface layer (for example, see Patent Document 1).

However, for example, when a user scrolls an image by a scrolling operation after inputting data, the conventional input support apparatus cannot report the presence of an input miss, an error of the input data, or the like to the user through a tactile sensation. Therefore, it is not user-friendly.

RELATED-ART DOCUMENTS

Patent Documents

[Patent Document 1] Japanese Laid-open Patent Publication No. 2013-126140

SUMMARY

According to an embodiment, a drive controlling apparatus drives a vibrating element of an electronic device, the electronic device including a display part, a top panel disposed on a display surface side of the display part and having a manipulation surface, a coordinate detector configured to detect coordinates of a manipulation input performed on the manipulation surface, and the vibrating element, which is configured to generate a vibration at the manipulation surface. The drive controlling apparatus includes: a storage part configured to store image data for a scrollable image, to be displayed on the display part and including an input field for inputting predetermined information, in association with position data that represents a position of the input field in the image and in association with input data input in the input field; a calculating part configured to calculate, based on the coordinates detected by the coordinate detector, an operation amount and an operation direction of a scrolling operation performed on the manipulation surface; a determining part configured to determine presence or absence of a deficiency in the input data input in the input field; and a drive controlling part configured to drive, upon the scrolling operation being performed on the top panel, the vibrating element by using a driving signal for generating a natural vibration in an ultrasound frequency band at the manipulation surface, the drive controlling part being configured, based on the operation amount and the operation direction of the scrolling operation calculated by the calculating part, on the presence or absence of the deficiency determined by the determining part, and on the position data, to drive the vibrating element according to a first pattern when the input field without the deficiency is being displayed on the display part and to drive the vibrating element according to a second pattern when the input field with the deficiency is not being displayed on the display part.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 9 is a diagram illustrating data stored in a memory;

FIG. 10 is a diagram illustrating data stored in the memory;

DESCRIPTION OF EMBODIMENT

Hereinafter, embodiments of the present invention will be described to which a drive controlling apparatus, an electronic device, a drive controlling program, and a drive controlling method are applied. It is an object in one aspect of the embodiment to provide a drive controlling apparatus, an electronic device, a drive controlling program, and a drive controlling method such that they are user-friendly.

First Embodiment

Figure 1:
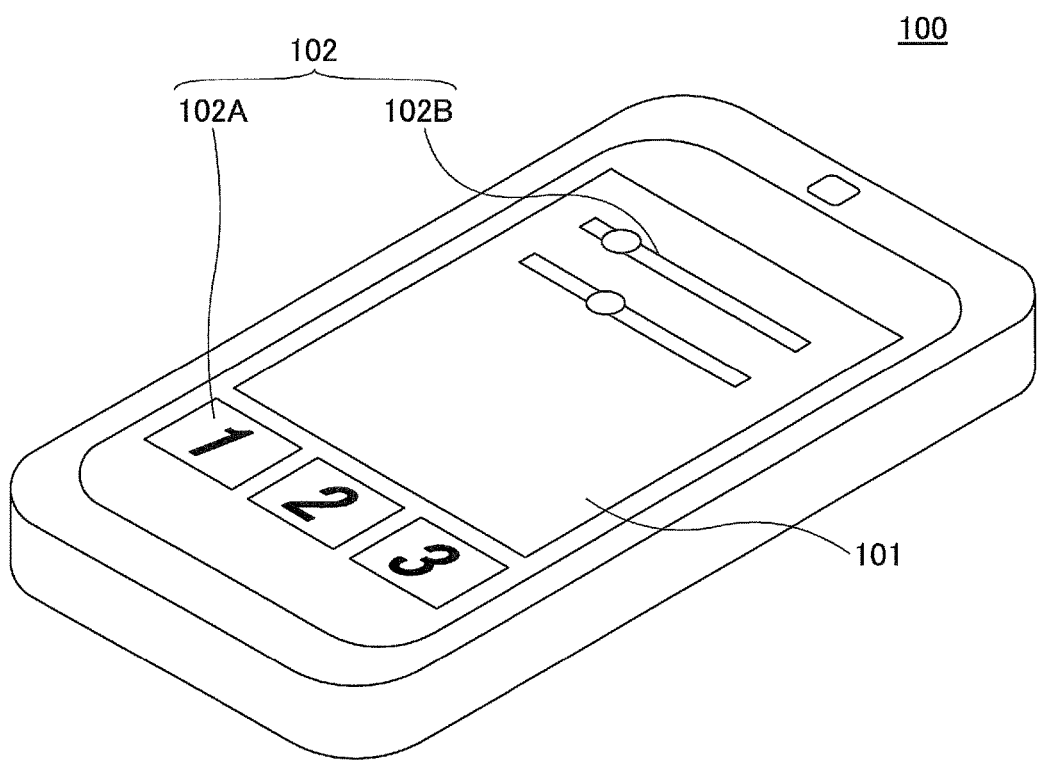
FIG. 1 is a perspective view illustrating an electronic device according to a first embodiment.

FIG. 1 is a perspective view illustrating an electronic device 100 according to a first embodiment.

For example, the electronic device 100 is a smartphone terminal device or a tablet computer that has a touch panel as a manipulation input part. The electronic device 100 may be any device as long as the device has a touch panel as a manipulation input part. Accordingly, the electronic device 100 may be a device such as a portable-type information terminal device, or an Automatic Teller Machine (ATM) placed at a specific location to be used, for example. Further, the electronic device 100 may be a device such as various types of controllers or navigation systems installed on a moving object or a vehicle such as an automobile or a motorbike.

For a manipulation input part 101 of the electronic device 100, a display panel is disposed under a touch panel, and various buttons including a button 102A, a slider 102B, or the like (hereinafter referred to as Graphic User Interface (GUI) manipulation part(s) 102) are displayed on the display panel.

A user of the electronic device 100 ordinarily touches the manipulation input part 101 by his or her fingertip(s) in order to manipulate the GUI manipulation part 102.

Next, a detailed configuration of the electronic device 100 will be described with reference to FIG. 2.

Figure 2:
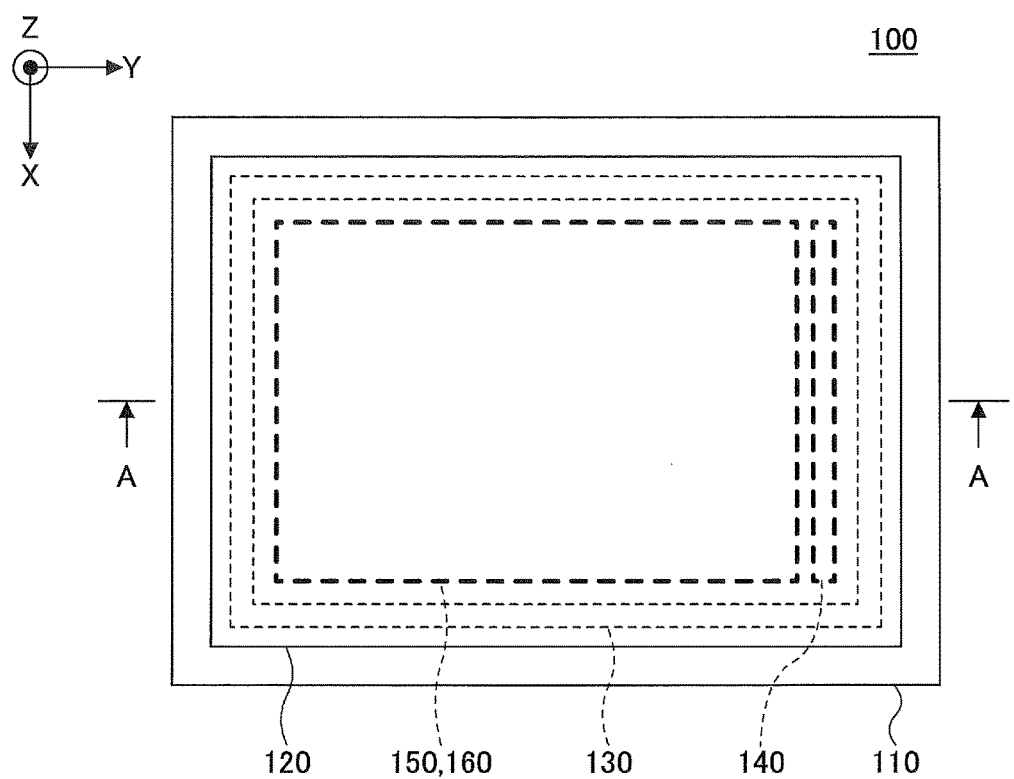
FIG. 2 is a plan view illustrating the electronic device according to the first embodiment.
Figure 3:
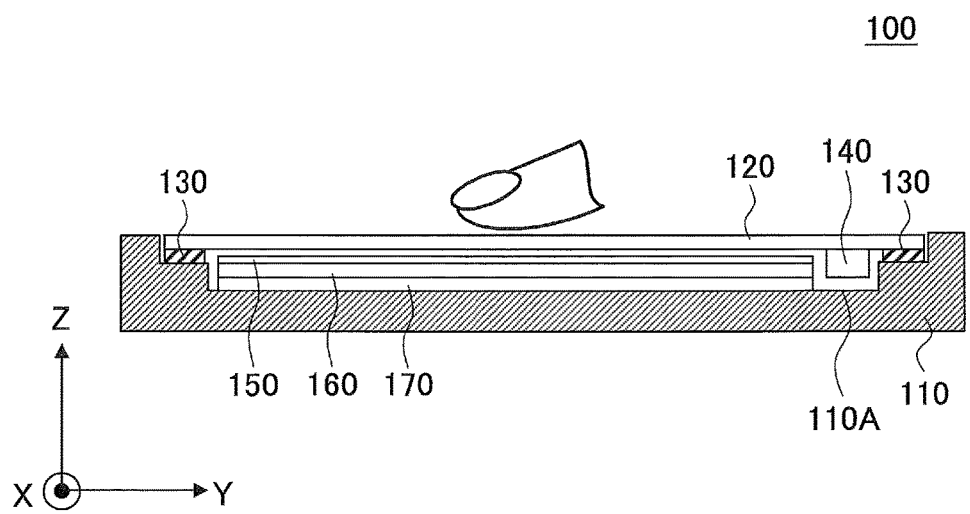
FIG. 3 is a cross-sectional view of the electronic device taken along a line A-A of FIG. 2.

FIG. 2 is a plan view illustrating the electronic device 100 of the first embodiment. FIG. 3 is a diagram illustrating a cross-sectional view of the electronic device 100 taken along a line A-A of FIG. 2. It should be noted that an XYZ coordinate system that is an orthogonal coordinate system is defined as illustrated in FIGS. 2 and 3.

The electronic device 100 includes a housing 110, the top panel 120, a double-faced adhesive tape 130, a vibrating element 140, the touch panel 150, the display panel 160, and a substrate 170.

The housing 110 is made of a plastic, for example. As illustrated in FIG. 3, the substrate 170, the display panel 160 and the touch panel 150 are disposed in a recessed portion 110A of the housing 110, and the top panel 120 is bonded on the housing 110 by the double-faced adhesive tape 130.

The top panel 120 is a thin flat-plate member having a rectangular shape in plan view, and is made of transparent glass or a reinforced plastic such as polycarbonate. A surface of the top panel 120 (a positive side surface in the Z axis direction) is one example of a manipulation surface on which the user of the electronic device 100 performs a manipulation input.

The vibrating element 140 is bonded on a negative side surface of the top panel 120 in the Z axis direction, and the four sides in plan view of the top panel 120 are bonded on the housing 110 by the double-faced adhesive tape 130. It should be noted that the double-faced adhesive tape 130 is not necessarily a rectangular-ring-shaped member in plan view as illustrated in FIG. 3, as long as the double-faced adhesive tape 130 can bond the four sides of the top panel 120 to the housing 110.

The touch panel 150 is disposed on the negative side in the Z axis direction of the top panel 120. The top panel 120 is provided in order to protect the surface of the touch panel 150. It should be noted that another panel, protection film or the like may be provided on the surface of the top panel 120.

In a state in which the vibrating element 140 is bonded on the negative side surface of the top panel 120 in the Z axis direction, the top panel 120 is vibrated by driving the vibrating element 140. In the first embodiment, a standing wave is generated at the top panel 120 by causing the top panel 120 to vibrate at a natural vibration frequency of the top panel 120. However, because the vibrating element 140 is bonded on the top panel 120, it is preferable to determine the natural vibration frequency in consideration of a weight of the vibrating element 140 and the like, in practice.

The vibrating element 140 is bonded on the negative side surface of the top panel 120 in the Z axis direction, at a positive side in the Y axis direction, along the short side extending in the X axis direction. The vibrating element 140 may be any element as long as it can generate vibration in an ultrasound frequency band. A piezoelectric element such as a piezo element may be used as the vibrating element 140, for example.

The vibrating element 140 is driven in accordance with a driving signal output from a drive controlling part which will be described later. A frequency and an amplitude (intensity) of the vibration generated by the vibrating element 140 are set by the driving signal. Further, on/off of the vibrating element 140 is controlled in accordance with the driving signal.

It should be noted that the ultrasound frequency band is a frequency band that is higher than or equal to approximately 20 kHz, for example. According to the electronic device 100 of the first embodiment, the frequency at which the vibrating element 140 vibrates is equal to a number of vibrations per unit time (frequency) of the top panel 120. Accordingly, the vibrating element 140 is driven in accordance with the driving signal such that the vibrating element 140 vibrates at a number of natural vibrations per unit time (natural vibration frequency) of the top panel 120.

The touch panel 150 is disposed on (the positive side in the Z axis direction of) the display panel 160 and is disposed under (the negative side in the Z axis direction of) the top panel 120. The touch panel 150 is one example of a coordinate detector that detects a position (in the following, the position is referred to as a position of the manipulation input) at which the user of the electronic device 100 touches the top panel 120.

Various Graphic User Interface (GUI) buttons or the like (hereinafter referred to as GUI manipulation part(s)) are displayed on the display panel 160 located under the touch panel 150. Therefore, the user of the electronic device 100 ordinarily touches the top panel 120 by his or her fingertip(s) in order to manipulate the GUI manipulation part.

The touch panel 150 is any coordinate detector as long as it can detect the position of the manipulation input on the top panel 120 performed by the user. The touch panel 150 may be a capacitance type coordinate detector or a resistance film type coordinate detector, for example. Here, the embodiment in which the touch panel 150 is a capacitance type coordinate detector will be described. The capacitance type touch panel 150 can detect the manipulation input performed on the top panel 120 even if there is a clearance gap between the touch panel 150 and the top panel 120.

Also, although the top panel 120 is disposed on the input surface side of the touch panel 150 in the described embodiment, the top panel 120 may be integrated with the touch panel 150. In this case, the surface of the touch panel 150 is equal to the surface of the top panel 120 illustrated in FIGS. 2 and 3, and the surface of the touch panel 150 constitutes the manipulation surface. The top panel 120 illustrated in FIGS. 2 and 3 may be omitted. In this case, the surface of the touch panel 150 constitutes the manipulation surface. In this case, a member having the manipulation surface may be vibrated at a natural vibration frequency of the member.

In a case where the touch panel 150 is of capacitance type, the touch panel 150 may be disposed on the top panel 120. In this case also, the surface of the touch panel 150 constitutes the manipulation surface. Also, in the case where the touch panel 150 is of capacitance type, the top panel 120 illustrated in FIGS. 2 and 3 may be omitted. In this case also, the surface of the touch panel 150 constitutes the manipulation surface. In this case, a member having the manipulation surface may be vibrated at a natural vibration frequency of the member.

The display panel 160 may be a display part that can display an image. The display panel 160 may be a liquid crystal display panel, an organic Electroluminescence (EL) panel or the like, for example. Inside the recessed portion 110A of the housing 110, the display panel 160 is arranged on (the positive side in the Z axis direction of) the substrate 170 using a holder or the like whose illustration is omitted.

The display panel 160 is driven and controlled by a driver Integrated Circuit (IC), which will be described later, and displays a GUI manipulation part, an image, characters, symbols, graphics, and/or the like in accordance with an operating state of the electronic device 100.

The substrate 170 is disposed inside the recessed portion 110A of the housing 110. The display panel 160 and the touch panel 150 are disposed on the substrate 170. The display panel 160 and the touch panel 150 are fixed to the substrate 170 and the housing 110 by a holder or the like (not shown).

On the substrate 170, a drive controlling apparatus, which will be described later, and circuits and the like that are necessary for driving the electronic device 100 are mounted.

According to the electronic device 100 having the configuration as described above, when the user touches the top panel 120 with his or her fingertip and a movement of the user's fingertip is detected, the drive controlling part mounted on the substrate 170 drives the vibrating element 140 to vibrate the top panel 120 at a frequency in the ultrasound frequency band. This frequency in the ultrasound frequency band is a resonance frequency of a resonance system including the top panel 120 and the vibrating element 140 and generates a standing wave at the top panel 120.

The electronic device 100 generates the standing waves in the ultrasound frequency band to provide tactile sensations to the user through the top panel 120.

Next, a standing wave generated at the top panel 120 will be described with reference to FIGS. 4A and 4B.

Figures 4A, 4B:
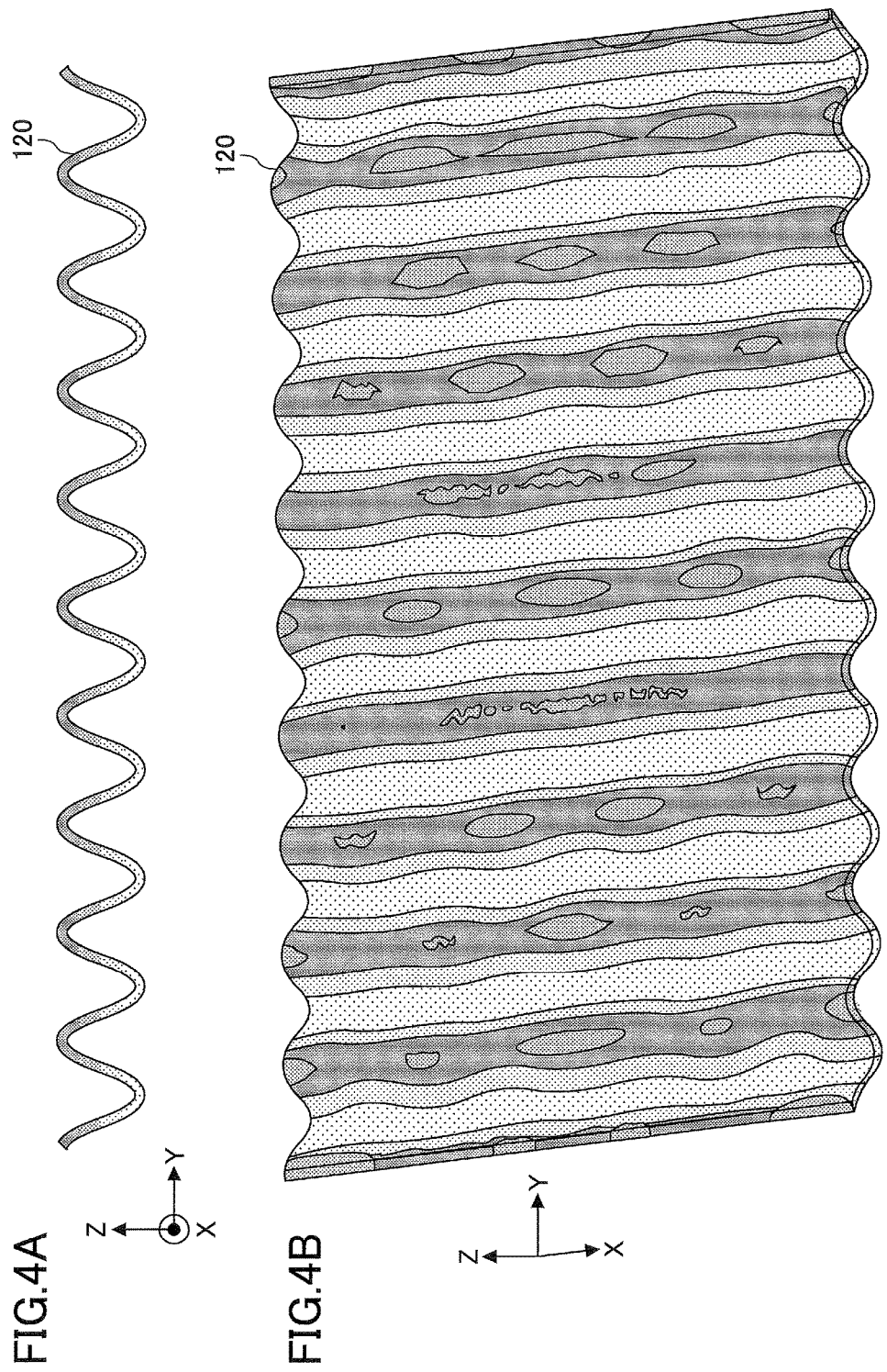
FIGS. 4A and 4B are diagrams illustrating crests formed in parallel with a short side of a top panel included in a standing wave generated at the top panel by a natural vibration in an ultrasound frequency band.

FIGS. 4A and 4B are diagrams illustrating crests formed parallel with the short side of the top panel 120 included in the standing wave generated at the top panel 120 by the natural vibration in the ultrasound frequency band. FIG. 4A is a side view, and FIG. 4B is a perspective view. In FIGS. 4A and 4B, a XYZ coordinate system similar to that of FIGS. 2 and 3 is defined. It should be noted that in FIGS. 4A and 4B, the amplitude of the standing wave is overdrawn in an easy-to-understand manner. Also, the vibrating element 140 is omitted in FIGS. 4A and 4B.

The natural vibration frequency (the resonance frequency) f of the top panel 120 is represented by the following formulas (1) and (2) where E is the Young's modulus of the top panel 120, $\rho$ is the density of the top panel 120, $\delta$ is the Poisson's ratio of the top panel 120, l is the long side dimension of the top panel 120, t is the thickness of the top panel 120, and k is a periodic number of the standing wave along the direction of the long side of the top panel 120. Because the standing wave has the same waveform in every half cycle, the periodic number k takes values at intervals of 0.5, therefore at 0.5, 1, 1.5, 2 . . . .

$$f = \frac{\pi k^2 t}{l^2}\sqrt{\frac{E}{3\rho(1-\delta^2)}} \quad (1)$$

$$f = \alpha k^2 \quad (2)$$

It should be noted that the coefficient $\alpha$ included in formula (2) corresponds to coefficients other than $k^2$ included in formula (1).

A waveform of the standing wave illustrated in FIGS. 4A and 4B is a waveform of a case where the periodic number k is 10, for example. In a case where a sheet of Gorilla (registered trademark) glass of which the length l of the long side is 140 mm, the length of the short side is 80 mm, and the thickness t is 0.7 mm is used as the top panel 120, for example, the natural vibration frequency f is 33.5 kHz when the periodic number k is 10. In this case, a driving signal whose frequency is 33.5 kHz may be used.

The top panel 120 is a planar member. When the vibrating element 140 (see FIGS. 2 and 3) is driven to generate the natural vibration in the ultrasound frequency band at the top panel 120, the top panel 120 deflects as illustrated in FIGS. 4A and 4B. As a result, the standing wave is generated in the surface of the top panel 120.

In the described embodiment, the single vibrating element 140 is bonded, on the negative side surface of the top panel 120 in the Z axis direction, at the location along the short side, which extends in the X axis direction, at the positive side in the Y axis direction. However, the electronic device 100 may use two vibrating elements 140. In a case where the electronic device 100 uses the two vibrating elements 140, another vibrating element 140 may be bonded, on the negative side surface of the top panel 120 in the Z axis direction, at a location along the short side, which extends in the X axis direction, at a negative side in the Y axis direction. In this case, the two vibrating elements 140 may be axisymmetrically disposed with respect to a center line of the top panel 120 parallel to the two short sides of the top panel 120.

Further, in a case where the electronic device 100 drives two vibrating elements 140, the two vibrating elements 140 may be driven in the same phase, if the periodic number k is an integer number. If the periodic number k is a decimal number (which is a number having an integer part and a decimal part), the two vibrating elements 140 may be driven in opposite phases.

Next, the natural vibration in the ultrasound frequency band generated at the top panel 120 of the electronic device 100 will be described with reference to FIGS. 5A and 5B.

Figure 5A:
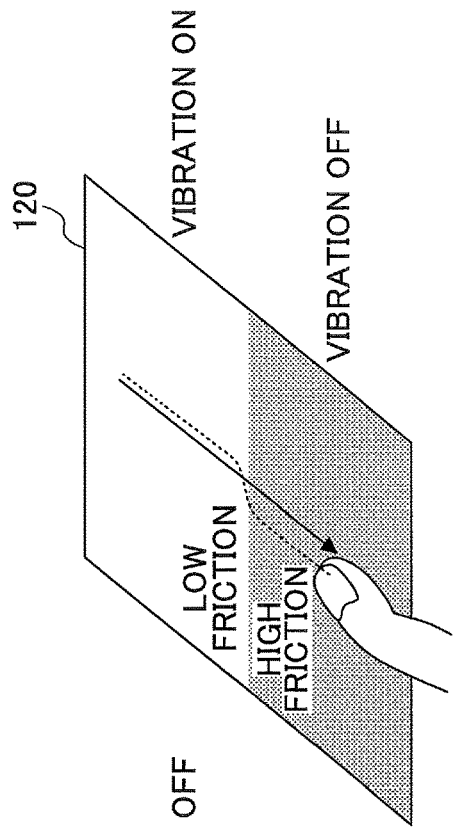
FIGS. 5A and 5B are diagrams illustrating cases where a kinetic friction force applied to a user's fingertip performing a manipulation input is varied by the natural vibration in the ultrasound frequency band generated at the top panel of the electronic device.
Figure 5B:
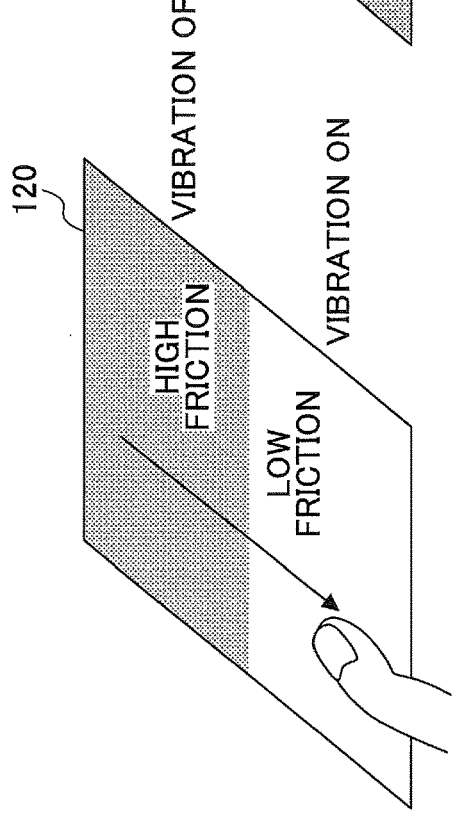

FIGS. 5A and 5B are diagrams illustrating cases where a kinetic friction force applied to a user's fingertip performing a manipulation input is varied by the natural vibration in the ultrasound frequency band generated at the top panel 120 of the electronic device 100. In FIGS. 5A and 5B, while touching the top panel 120 with the user's fingertip, the user performs the manipulation input by moving his or her fingertip along the arrow from a far side to a near side of the top panel 120. It should be noted that the vibration is turned on/off by turning on/off the vibrating element 140 (see FIGS. 2 and 3).

In FIGS. 5A and 5B, areas which the user's fingertip touches while the vibration is off are indicated in grey, with respect to the depth direction of the top panel 120. Areas which the user's finger touches while the vibration is on are indicated in white, with respect to the depth direction of the top panel 120.

As illustrated in FIGS. 4A and 4B, the natural vibration in the ultrasound frequency band occurs in the entire top panel 120. FIGS. 5A and 5B illustrate operation patterns in which on/off of the vibration is switched while the user's finger is tracing the top panel 120 from the far side to the near side.

Accordingly, in FIGS. 5A and 5B, the areas which the user's finger touches while the vibration is off are indicated in grey, and the areas which the user's finger touches while the vibration is on are indicated in white.

In the operation pattern illustrated in FIG. 5A, the vibration is off when the user's finger is located on the far side of the top panel 120, and the vibration is turned on in the process of moving the user's finger toward the near side.

Conversely, in the operation pattern illustrated in FIG. 5B, the vibration is on when the user's finger is located on the far side of the top panel 120, and the vibration is turned off in the process of moving the user's finger toward the near side.

Here, when the natural vibration in the ultrasound frequency band is generated at the top panel 120, a layer of air is interposed between the surface of the top panel 120 and the user's finger. The layer of air is provided by a squeeze effect. Thus, a kinetic friction coefficient on the surface of the top panel 120 is decreased when the user traces the surface with the user's finger.

Accordingly, in the grey area located on the far side of the top panel 120 illustrated in FIG. 5A, the kinetic friction force applied to the user's fingertip increases. In the white area located on the near side of the top panel 120, the kinetic friction force applied to the user's fingertip decreases.

Therefore, a user who is performing the manipulation input on the top panel 120 as illustrated in FIG. 5A senses a decrease of the kinetic friction force applied to the user's fingertip when the vibration is turned on. As a result, the user senses a slippery or smooth touch (texture) with the user's fingertip. In this case, the user senses as if a concave portion were present on the surface of the top panel 120, when the surface of the top panel 120 becomes smoother and the kinetic friction force decreases.

Conversely, in the white area located on the far side of the top panel 120 illustrated in FIG. 5B, the kinetic friction force applied to the user's fingertip decreases. In the grey area located on the near side of the top panel 120, the kinetic friction force applied to the user's fingertip increases.

Therefore, a user who is performing the manipulation input on the top panel 120 as illustrated in FIG. 5B senses an increase of the kinetic friction force applied to the user's fingertip when the vibration is turned off. As a result, the user senses a grippy or scratchy touch (texture) with the user's fingertip. In this case, the user senses as if a convex portion were present on the surface of the top panel 120, when the user's fingertip becomes grippy and the kinetic friction force increases.

As described above, the user can feel a concavity and convexity with his or her fingertip in the cases as illustrated in FIGS. 5A and 5B. For example, "The Printed-matter Typecasting Method for Haptic Feel Design and Sticky-band Illusion" (the Collection of papers of the 11th SICE system integration division annual conference (SI2010, Sendai)_174-177, 2010-12) discloses that a person can sense a concavity or a convexity. "Fishbone Tactile Illusion" (Collection of papers of the 10th Congress of the Virtual Reality Society of Japan (September, 2005)) also discloses that a person can sense a concavity or a convexity.

Although a variation of the kinetic friction force when the vibration is switched on/off is described above, a variation of the kinetic friction force is similarly obtained when the amplitude (intensity) of the vibrating element 140 is varied.

Next, a configuration of the electronic device 100 of the first embodiment will be described with reference to FIG. 6.

Figure 6:
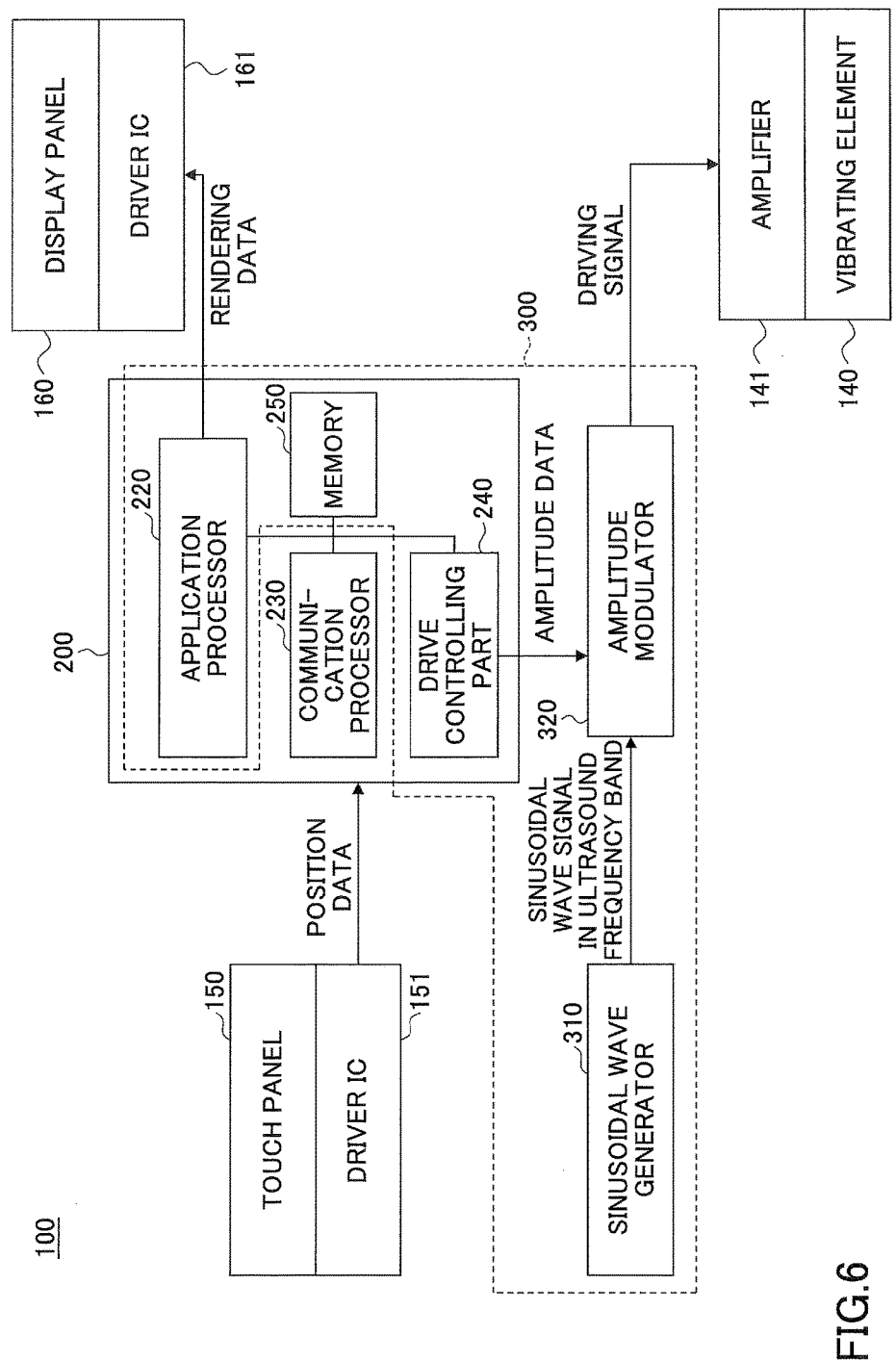
FIG. 6 is a diagram illustrating a configuration of the electronic device according to the first embodiment.

FIG. 6 is a diagram illustrating the configuration of the electronic device 100 of the first embodiment.

The electronic device 100 includes the vibrating element 140, an amplifier 141, the touch panel 150, a driver Integrated Circuit (IC) 151, the display panel 160, a driver IC 161, a controlling part 200, a sinusoidal wave generator 310, and an amplitude modulator 320.

The controlling part 200 includes an application processor 220, a communication processor 230 a drive controlling part 240, and a memory 250. The controlling part 200 is realized by an IC chip, for example.

The drive controlling part 240, the memory 250, the application processor 220, the sinusoidal wave generator 310, and the amplitude modulator 320 constitute a drive controlling apparatus 300. Note that the drive controlling apparatus 300 may include a scrolling degree calculating part within the application processor 220. Within the application processor 220, the scrolling degree calculating part is a part that calculates an operation amount and an operation direction of a scrolling operation.

Note that although the application processor 220, the communication processor 230, the drive controlling part 240, and the memory 250 are realized by one controlling part 200 in the embodiment described here, the drive controlling part 240 may be disposed outside the controlling part 200 as another IC chip or processor. In this case, data that is necessary for drive control of the drive controlling part 240 among data stored in the memory 250, may be stored in a memory other than the memory 250 and may be provided inside the drive controlling apparatus 300.

In FIG. 6, the housing 110, the top panel 120, the double-faced adhesive tape 130, and the substrate 170 (see FIG. 2) are omitted. Here, the amplifier 141, the driver IC 151, the driver IC 161, the drive controlling part 240, the memory 250, the sinusoidal wave generator 310, and the amplitude modulator 320 will be described.

The amplifier 141 is disposed between the drive controlling apparatus 300 and the vibrating element 140. The amplifier 141 amplifies the driving signal output from the drive controlling apparatus 300 to drive the vibrating element 140.

The driver IC 151 is coupled to the touch panel 150. The driver IC 151 detects position data that represents a position on the touch panel 150 at which a manipulation input is performed, and outputs the position data to the controlling part 200. As a result, the position data is input to the application processor 220 and the drive controlling part 240. Note that inputting the position data to the drive controlling part 240 is equivalent to inputting the position data to the drive controlling apparatus 300.

The driver IC 161 is coupled to the display panel 160. The driver IC 161 inputs rendering data, output from the drive controlling apparatus 300, to the display panel 160 and causes the display panel 160 to display an image that is based on the rendering data. In this way, a GUI manipulation part, an image, or the like based on the rendering data is displayed on the display panel 160.

The application processor 220 performs processes for executing various applications of the electronic device 100. Further, the application processor 220 calculates an operation amount and an operation direction of a scrolling operation based on a change of the position data detected by the touch panel 150.

Based on the data that represents the operation amount and the operation direction of the detected scrolling operation, upon the scrolling operation being performed on the top panel 120, the application processor 220 scrolls the image displayed on the display panel 160. When the application processor 220 scrolls the image displayed on the display panel 160, the image may be scrolled by inertia of the scrolling operation on the top panel 120.

Further, the application processor 220 inputs the data, which represents the operation amount and the operation direction of the detected scrolling operation, to the drive controlling part 240. The application processor 220 is an example of a scrolling degree calculating part. Note that the drive controlling part 240 may calculate an operation amount and an operation direction of a scrolling operation based on a change of the position data detected by the touch panel 150.

The communication processor 230 executes necessary processes such that the electronic device 100 performs communications such as 3G (Generation), 4G (Generation), LTE (Long Term Evolution), and WiFi.

The drive controlling part 240 outputs amplitude data to the amplitude modulator 320 in a case where two predetermined conditions are satisfied. The amplitude data is data that represents amplitude value(s) for adjusting an intensity of a driving signal used to drive the vibrating element 140. The amplitude value(s) is set in accordance with a degree of time change of the position data. Here, a speed of the user's fingertip moving along the surface of the top panel 120 is used as the degree of time change of the position data. The drive controlling part 240 may calculate the moving speed of the user's fingertip based on a degree of time change of the position data input from the driver IC 151.

For example, in order to make a tactile sensation, to be sensed by the user from the user's fingertip, constant regardless of the moving speed of the user's fingertip, the drive controlling apparatus 300 of the first embodiment decreases the amplitude value as the moving speed increases, and increases the amplitude value as the moving speed decreases.

First data that represents a relationship between the amplitude data, representing such amplitude value(s), and the moving speed is stored in the memory 250.

It should be noted that although the amplitude value in accordance with the moving speed is set by using the first data in the described embodiment, the amplitude value A may be calculated using the following formula (3). The amplitude value A calculated by the formula (3) decreases as the moving speed increases, and increases as the moving speed decreases.

$$A = A_0 / \sqrt{|V|/a} \qquad (3)$$

Here, "$A_0$" is a reference value of the amplitude, "V" represents the moving speed of the fingertip and "a" is a predetermined constant value. In a case where the amplitude value A is calculated by using the formula (3), data representing the formula (3) and data representing the reference value $A_0$ and the predetermined constant value a may be stored in the memory 250.

The drive controlling apparatus 300 of the first embodiment causes the top panel 120 to vibrate in order to vary the kinetic friction force applied to the user's fingertip when the user's fingertip moves along the surface of the top panel 120. Because the kinetic friction force occurs when the user's fingertip is in motion, the drive controlling part 240 causes the vibrating element 140 to vibrate when the moving speed becomes greater than or equal to a predetermined threshold speed. The first predetermined condition is that the moving speed is greater than or equal to the predetermined threshold speed.

Accordingly, the amplitude value represented by the amplitude data output from the drive controlling part 240 is zero in a case where the moving speed is less than the predetermined threshold speed. The amplitude value is set to be a predetermined amplitude value corresponding to the moving speed in a case where the moving speed becomes greater than or equal to the predetermined threshold speed. When the moving speed is greater than or equal to the predetermined threshold speed, the amplitude value is set to be smaller as the moving speed increases, and the amplitude value is set to be larger as the moving speed decreases.

The drive controlling apparatus 300 of the first embodiment outputs the amplitude data to the amplitude modulator 320 in a case where the position of the user's fingertip performing the manipulation input is within a predetermined area in which a vibration is to be generated. The second predetermined condition is that the position of the user's fingertip performing the manipulation input is within the predetermined area in which the vibration is to be generated.

It is determined whether the position of the user's fingertip performing the manipulation input is within the predetermined area, in which a vibration is to be generated, based on whether the position of the user's fingertip performing the manipulation input is located inside the predetermined area in which the vibration is to be generated.

Here, a position of a GUI manipulation part to be displayed on the display panel 160, of a area for displaying an image, of a area representing an entire page, or the like on the display panel 160 is specified by area data that represents the area. The area data is provided, in all applications, with respect to all GUI manipulation parts to be displayed on the display panel 160, the area for displaying an image, or the area representing the entire page.

Accordingly, when the drive controlling apparatus 300 determines, as the second predetermined condition, whether the position of the user's fingertip performing the manipulation input is within the predetermined area in which a vibration is to be generated, a type of the application(s) activated by the electronic device 100 is of concern to the determination. This is because contents displayed on the display panel 160 differ depending on the types of the applications.

Further, this is because types of the manipulation inputs of moving the user's fingertip(s) touching the surface of the top panel 120 differ depending on the types of the applications. For example, there is a flick operation as a type of a manipulation input performed by moving the user's fingertip(s) touching the surface of the top panel 120 when manipulating a GUI manipulation part. The flick operation is an operation performed by moving the user's fingertip for a relatively short distance to flick (snap) the surface of the top panel 120.

In a case where the user turns over a page, a swipe operation is performed, for example. The swipe operation is an operation performed by moving the user's fingertip for a relatively long distance to swipe the surface of the top panel 120. The swipe operation is performed when the user flips a page or a photo, for example. Further, in a case of sliding the slider of the GUI manipulation part (see the slider 102B in FIG. 1), a drag operation is performed to drag the slider.

The manipulation inputs that are performed by moving the user's fingertip(s) touching the surface of the top panel 120, such as the flick operation, the swipe operation and the drag operation that are introduced as examples, are used differently depending on types of displayed contents by the applications. Accordingly, the type of the application executed by the electronic device 100 is related to determining whether the position of the user's fingertip performing the manipulation input is within the predetermined area in which a vibration is to be generated.

The drive controlling part 240 uses the area data to determine whether the position represented by the position data input from the driver IC 151 is within the predetermined area in which a vibration is to be generated.

The memory 250 stores the second data that associates data, which represents the types of the applications, with the area data, which represents the areas of the GUI input parts or the like in which a manipulation input is to be performed, and with pattern data, which represents vibration patterns.

The drive controlling part 240 performs the following processes in order to interpolate a positional change of the position of the user's fingertip during the required duration of time from a point of time when the position data is input to the drive controlling apparatus 300 from the driver IC 151 to a point of time when the driving signal is calculated based on the position data.

The drive controlling apparatus 300 performs calculation for each predetermined control cycle. Similarly, the drive controlling part 240 also performs calculation for each predetermined control cycle. Hence, when the required duration of time, from the point of time when position data is input from the driver IC 151 to the drive controlling apparatus 300 to the point of time when the driving signal is calculated by the drive controlling part 240 based on the position data, is Δt, the required duration Δt of time is equal to the control cycle.

Here, the moving speed of the user's fingertip can be calculated as a velocity of a vector that has a starting point (x1, y1) represented by the position data input to the drive controlling apparatus 300 from the driver IC 151 and a terminal point (x2, y2) corresponding to the position of the user's fingertip after an elapse of the required duration Δt of time.

The drive controlling part 240 estimates coordinates (x3, y3) after the elapse of the required duration Δt of time by calculating a vector having a starting point (x2, y2) represented by the position data input to the drive controlling apparatus 300 from the driver IC 151 and a terminal point (x3, y3) corresponding to the position of the user's fingertip after the elapse of the required duration Δt of time.

The electronic device 100 of the first embodiment interpolates the positional change of the position of the user's fingertip having arisen in the required duration Δt of time by estimating coordinates after the elapse of the required duration Δt of time as described above.

The drive controlling part 240 performs such calculation of estimating the coordinates after the elapse of the required duration Δt of time. The drive controlling part 240 determines whether the estimated coordinates are located inside the predetermined area in which a vibration is to be generated and generates the vibration when the estimated coordinates are located inside the predetermined area. Accordingly, the second predetermined condition is that the estimated coordinates are located inside the predetermined area in which a vibration is to be generated.

As described above, the two predetermined conditions required for the drive controlling part 240 to output the amplitude data to the amplitude modulator 320 are that the moving speed of the user's fingertip is greater than or equal to the predetermined threshold speed and that the estimated coordinates are located in the predetermined area in which a vibration is to be generated.

In a case where the moving speed of the user's fingertip is greater than or equal to the predetermined threshold speed and the estimated coordinates are located inside the predetermined area in which the vibration is to be generated, the drive controlling part 240 reads amplitude data that represents an amplitude value corresponding to the moving speed from the memory to output the amplitude data to the amplitude modulator 320.

The memory 250 stores the first data that represents a relationship between the amplitude data representing amplitude values and the moving speeds, and stores the second data that associates data, which represents the types of the applications, with the area data, which represents the areas of the GUI input parts or the like in which a manipulation input is to be performed, and with the pattern data, which represents vibration patterns.

Further, the memory 250 stores programs and data necessary for the application processor 220 to execute the applications, and stores programs and data necessary for communicating processing of the communication processor 230, and the like.

The sinusoidal wave generator 310 generates sinusoidal waves required for generating the driving signal that is for vibrating the top panel 120 at the natural vibration frequency. For example, in a case of causing the top panel 120 to vibrate at the natural vibration frequency f of 33.5 kHz, a frequency of the sinusoidal waves becomes 33.5 kHz. The sinusoidal wave generator 310 inputs a sinusoidal wave signal in the ultrasound frequency band to the amplitude modulator 320.

Using the amplitude data input from the drive controlling part 240, the amplitude modulator 320 modulates an amplitude of the sinusoidal wave signal, input from the sinusoidal wave generator 310, to generate a driving signal. The amplitude modulator 320 modulates only the amplitude of the sinusoidal wave signal in the ultrasound frequency band, input from the sinusoidal wave generator 310, to generate the driving signal without modulating a frequency and a phase of the sinusoidal wave signal.

Hence, the driving signal output from the amplitude modulator 320 is a sinusoidal wave signal in the ultrasound frequency band obtained by modulating only the amplitude of the sinusoidal wave signal in the ultrasound frequency band input from the sinusoidal wave generator 310. It should be noted that in a case where the amplitude data is zero, the amplitude of the driving signal is zero. This is the same as the amplitude modulator 320 not outputting the driving signal.

Next, data stored in the memory 250 and scrollable image data will be described with reference to FIG. 7 to FIG. 11.

Figure 7:
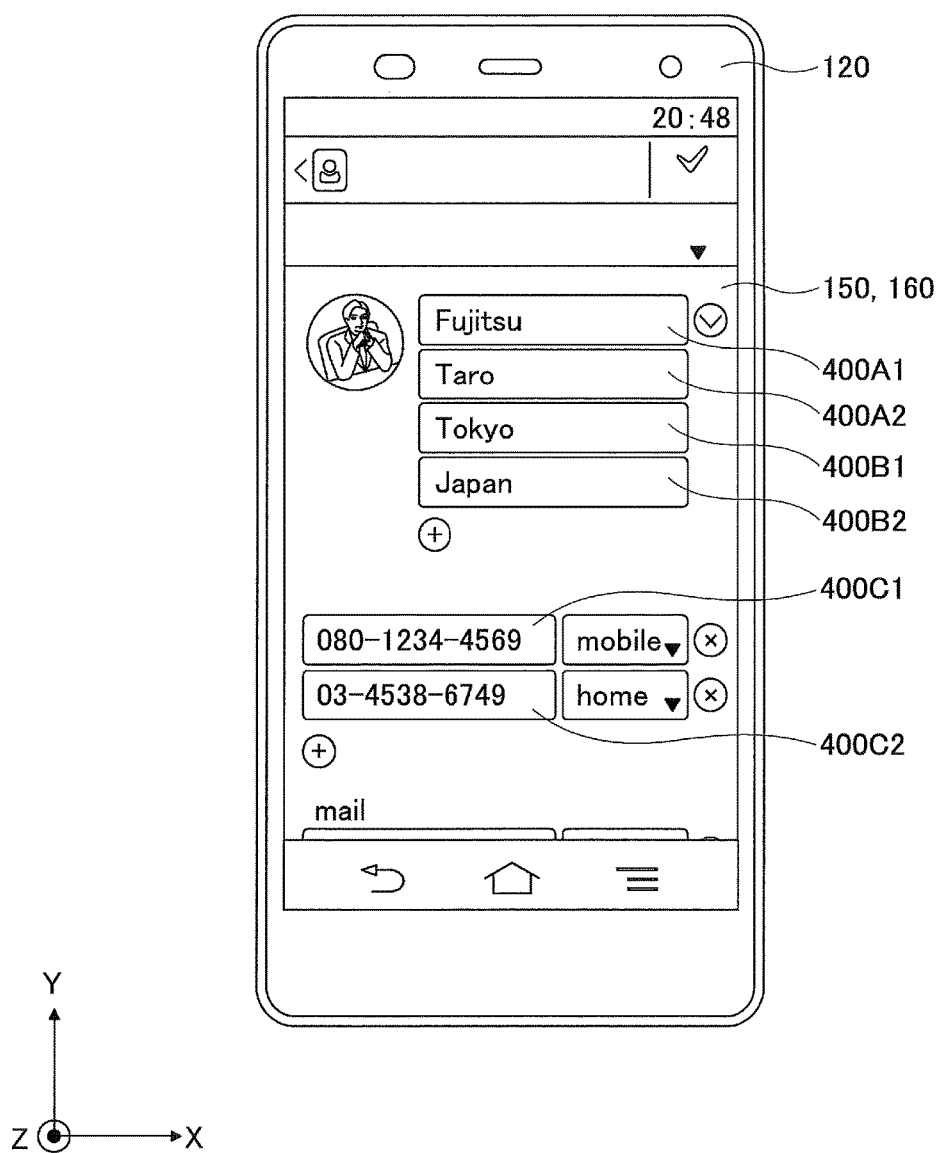
FIG. 7 is a diagram illustrating an example displayed on the electronic device of the first embodiment.

FIG. 7 is a diagram illustrating an example displayed on the electronic device 100 of the first embodiment. Note that an XYZ coordinate system that is common with FIG. 2 to FIG. 4 is defined in FIG. 7.

In FIG. 7, in the display panel 160, a first name (Taro) and a last name (Fujitsu) are respectively input, by letters of the alphabet, in input fields 400A2 and 400A1 in an edit screen of contact information. A city name (Tokyo) and a country name (Japan) are respectively input, by letters of the alphabet, in input fields 400B1 and 400B2. Further, a mobile phone number and a home phone number are respectively input in input fields 400C1 and 400C2.

Figure 8:
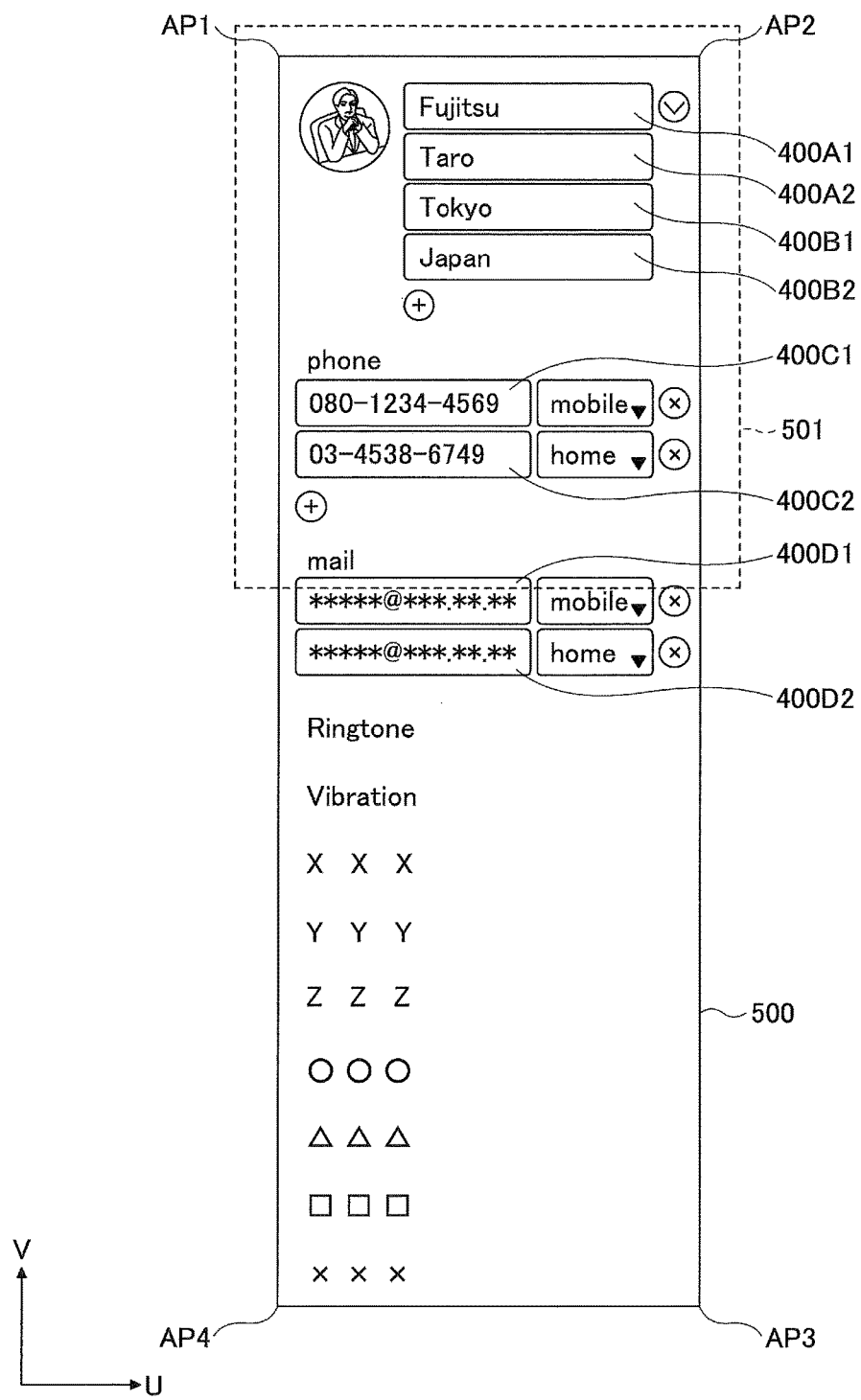
FIG. 8 is a diagram illustrating an entire scrollable image.

FIG. 8 is a diagram illustrating the entire scrollable image. FIG. 9 and FIG. 10 are diagrams illustrating data stored in the memory 250.

FIG. 8 illustrates a scrollable image 500. The scrollable image 500 is represented by image data in which only a part 501 is displayed on the display panel 160 (see FIG. 7) and an area to be displayed on the display panel 160 can be selected by a user performing a scrolling operation.

The part 501 of the image 500 illustrated in FIG. 8 is displayed on the display panel 160 illustrated in FIG. 7. Within the entire image 500, the part 501 of the image 500 can be treated as a display area to be displayed on the display panel 160. Coordinates of the display area (part 501) are represented by coordinate values of a UV coordinate system.

The image 500 is image data of which the entirety has a rectangular area, and represents the edit screen of contact information. In the image 500, the input fields 400A1, 400A2, 400B1, 400B2, 400C1, 400C2, 400D1, and 400D2 are displayed. In the following, the input fields 400A1, 400A2, 400B1, 400B2, 400C1, 400C2, 400D1 and 400D2 are referred to as the input fields 400A1 to 400D2.

The image 500 illustrated in FIG. 8 is a screen to which a first name and a last name, a city name, a country name, phone numbers, e-mail addresses, a ringtone, a vibration, and other personal information are input in English. In FIG. 8, the first name (Taro) and the last name (Fujitsu) are respectively input, by letters of the alphabet, in the input fields 400A2 and 400A1. The city name (Tokyo) and the country name (Japan) are respectively input, by letters of the alphabet, in the input fields 400B1 and 400B2. Further, the mobile phone number and the home phone number are respectively input in the input fields 400C1 and 400C2, and the home mail addresses and the company mail addresses are respectively input in the input fields 400D1 and 400D2.

XXX, YYY, ZZZ, ○○○, △△△, □□□, . . . , and xxx illustrated in FIG. 8 represent other individual information, and input fields for these information may be provided.

The image 500 includes four apexes AP1, AP2, AP3, and AP4. Coordinates of the four apexes AP1, AP2, AP3, and AP4 represent the entire area of the scrollable image.

Further, the formulas that represent four straight lines connecting the four apexes AP1, AP2, AP3, and AP4, are the four sides of the scrollable image, and represent coordinates of the edges.

Two-dimensional coordinates of the image 500 are defined by the UV coordinate system. The UV coordinate system defines coordinates that represent a position of a displayed content and the coordinates of the image 500 illustrated in FIG. 8, and the U axis is a direction that is the same direction as the X axis and the V axis is a direction that is the same as the Y axis. The U axis and the V axis are respectively associated with the X axis and the Y axis.

The area displayable on the display panel 160 is the part 501 of the image 500. Upon a scrolling operation being performed on the top panel 120 in the Y axis direction to scroll the image 500 in the V axis direction, a position of the part 501 moves in the V axis direction. Moving the position of the part 501 in the V axis direction means moving the display area, within the image 500, displayed on the display panel 160 in the V axis direction.

Here, a width of the part 501 in the U axis direction is equal to a width of the image 500 in the U axis direction. Thus, the image 500 displayed as an example here cannot be scrolled in the U axis direction but can be scrolled only in the V axis direction.

That is, the image 500 is not scrolled even when a scrolling operation in the X axis direction is performed on the top panel 120, and the image 500 is scrolled in the V axis direction in a case where a scrolling operation in the Y axis direction is performed on the top panel 120.

Note that it is determined as to whether the scrolling operation performed on the top panel 120 is in the Y axis direction based on whether the operation is within the range of a predetermined angle from the extending direction of the Y axis. For example, the predetermined angle may be set to be approximately ±10 degrees.

The image 500 has an edge AP1-AP2 connecting the apexes AP1 and AP2 and an edge AP3-AP4 connecting the apexes AP3 and AP4.

Data illustrated in FIG. 9 is data that associates application IDs (Identifications) with image data, input field coordinate data, and input data.

The application IDs are data that represent types of applications, and FIG. 9 illustrates ID1, ID2, and ID3. The applications represented by the application IDs include all applications usable in a device such as a smartphone terminal device, a tablet computer, a touch panel device, or an in-vehicle device, and include a mode for editing an e-mail.

The image data is image data for scrollable images, and image_1, image_2, and image_3 are illustrated. The image data is data that represents various images to be displayed on the display panel 160 by activating various applications.

The input field coordinate data is data that represents coordinates of input fields inside the image 500, such as the input fields 400A1 to 400D2 illustrated in FIG. 8, and formulas f1 to f3 are illustrated as an example in FIG. 9. The formulas f1 to f3 are data that represent ranges of coordinates at which the input ranges are present in a functional form, and are defined by the UV coordinate system that represents two-dimensional coordinates of the image 500.

The U axis and the V axis are respectively associated with the X axis and the Y axis.

The input data is data that is input to the input fields, and FIG. 9 illustrates data_1, data_2, and data_3 as an example. Note that with respect to an input field to which data is not input, input data is not present.

Data illustrated in FIG. 10 is data that associates displayed contents at the time of scrolling operations with vibration patterns. FIG. 10 illustrates vibration patterns P1, P1, and P2 that are respectively used in three states, which are a state in which an input field without a deficiency in input data is being displayed, a state in which an input field with a deficiency in input data is within a display area, and a state in which an input field with a deficiency in input data is not within a display area.

Here, a deficiency in input data means, for example, a state in which data is not being correctly input in an input field such as a state in which data is not input in an input field to which data is required to be input and a state in which data input in an input field has an error. Further, for example, a state in which the number of digits of a phone number is incorrect and a state in which the number or type of characters of an e-mail address does not satisfy required conditions are fall under the state in which data has an error.

The state in which an input field without a deficiency in input data is within a display area means a state in which a deficiency is not present in data of an input field included in the display area. The state in which an input field with a deficiency in input data is within a display area means a state in which a deficiency is present in data of an input field included in the display area. Further, the state in which an input field with a deficiency in input data is not within a display area means a state in which a deficiency is present in data of an input field that is not included in the display area.

When a scrolling operation is performed on the top panel 120 in the Y axis direction while an input field without a deficiency in input data is being displayed on the display panel 160, the vibrating element 140 is driven according to the vibration pattern P1. The vibration pattern P1 is a vibration pattern for generating a natural vibration in the ultrasound frequency band at a constant amplitude, and is an example of a first pattern.

When a scrolling operation is performed on the top panel 120 in the Y axis direction while an input field having a deficiency in input data is being displayed on the display panel 160, the vibrating element 140 is driven according to the vibration pattern P1. The vibration pattern P1 for when an input field having a deficiency in input data is being displayed is an example of a third pattern.

The vibration pattern P1 is a vibration pattern for generating the natural vibration in the ultrasound frequency band with a constant amplitude. Note that the reason will be described later below why the vibration pattern P1 for when an input field with a deficiency in input data is being displayed is the same as the vibration pattern P1 for when an input field without a deficiency in input data is within a display area.

When a scrolling operation is performed on the top panel 120 in the Y axis direction while an input field having a deficiency in input data is not being displayed on the display panel 160, the vibrating element 140 is driven according to the vibration pattern P2. The vibration pattern P2 is a vibration pattern intermittently generated at a short cycle by the natural vibration in the ultrasound frequency band, and is an example of a second pattern.

Next, an example of an operation of the electronic device 100 will be described with reference to FIG. 11 and FIG. 12.

Figure 11:
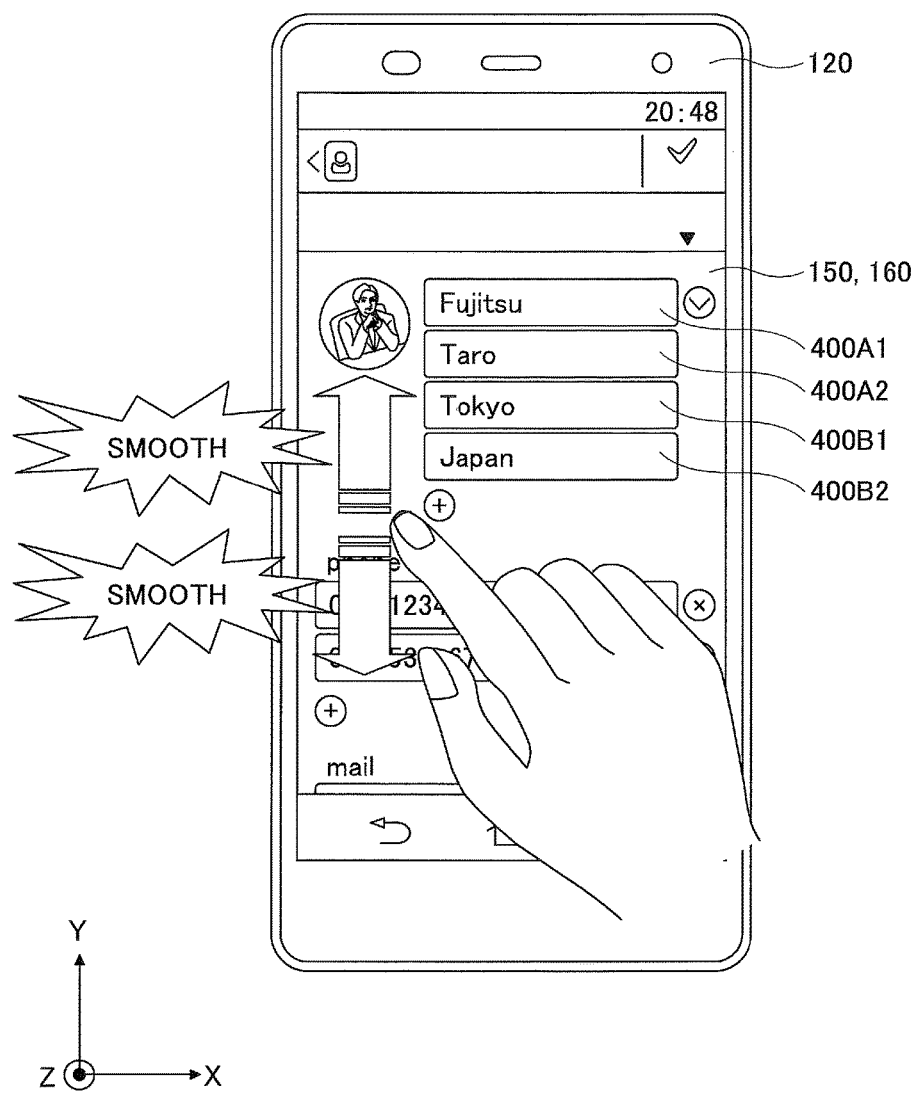
FIG. 11 is a diagram illustrating an example of an operation of the electronic device of the first embodiment.

FIG. 11 is a diagram illustrating an example of an operation of the electronic device 100 of the first embodiment. FIG. 11 illustrates a state in which an edit screen of contact information is displayed on the display panel 160 similar to that of FIG. 7 and the first name (Taro) and the last name (Fujitsu) are respectively input, by letters of the alphabet, in the input fields 400A2 and 400A1, the city name (Tokyo) and the country name (Japan) are respectively input, by letters of the alphabet, in the input fields 400B1 and 400B2, and the mobile phone number and the home phone number are respectively input in the input fields 400C1 and 400C2.

That is, FIG. 11 illustrates a state in which data is correctly input in the input fields 400A1, 400A2, 400B1, 400B2, 400C1, and 400C2 displayed on the display panel 160.

Here, when the user performs a scrolling operation as illustrated by the arrows, in order to scroll the image 500 in the positive side or the negative side in the Y axis direction, the electronic device 100 drives the vibrating element 140 to generate the natural vibration in the ultrasound frequency band at the top panel 120 because the data is correctly input in the input fields 400A1, 400A2, 400B1, 400B2, 400C1, and 400C2 being displayed on the display panel 160.

This vibration pattern is the vibration pattern P1 for continuously generating, at the top panel 120, the natural vibration in the ultrasound frequency band with a constant amplitude. As a result, a smooth tactile sensation with a low kinetic friction force is provided to the user's fingertip. This tactile sensation is provided by the squeeze effect.

Figure 12:
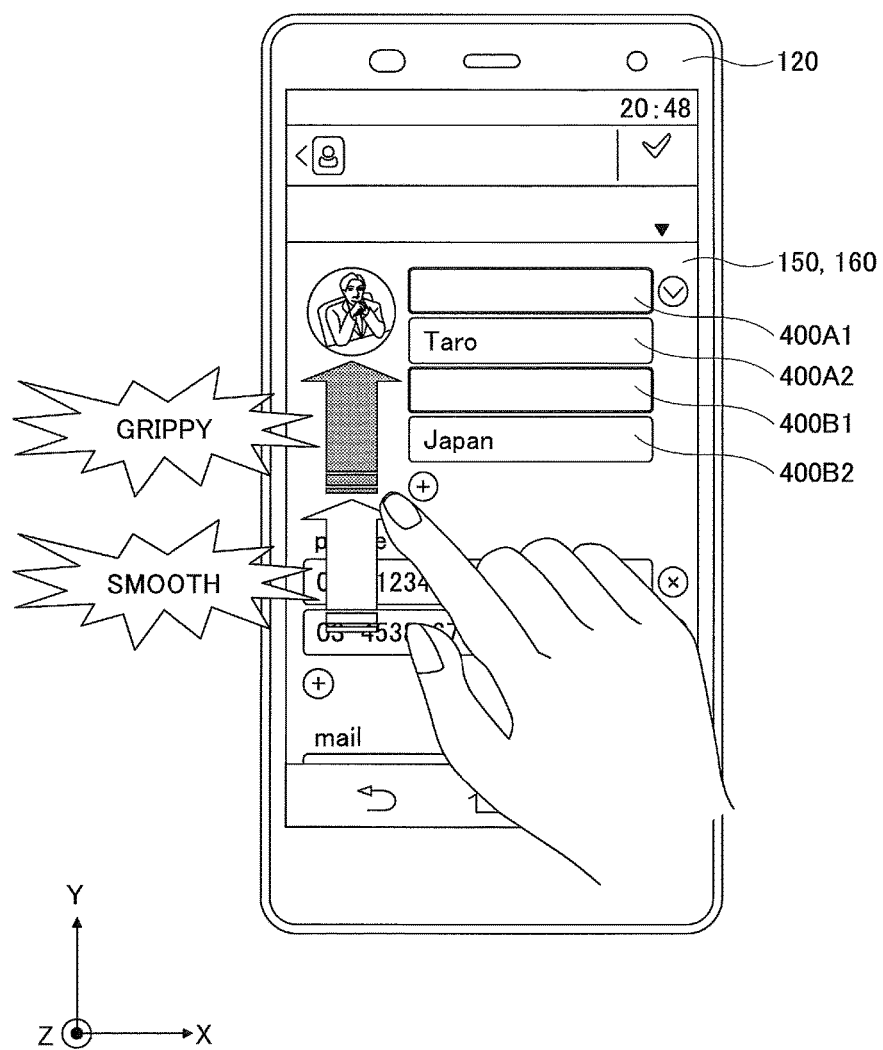
FIG. 12 is a diagram illustrating an example of another operation of the electronic device of the first embodiment.

FIG. 12 is a diagram illustrating another example of an operation of the electronic device 100 of the first embodiment. FIG. 12 illustrates a state in which an edit screen of contact information is displayed on the display panel 160 similar to that of FIG. 7 and the first name (Taro) is input in the input field 400A2 without an input of a last name in the input field 400A1, the country name (Japan) is input in the input field 400B2 without an input of a city name in the input field 400B1, and the mobile phone number and the home phone number are respectively input in the input fields 400C1 and 400C2.

That is, FIG. 12 illustrates a state in which data is not input in the input fields 400A1 and 400B1 displayed on the display panel 160.

Here, when the user performs a scrolling operation as illustrated by the arrows in order to scroll the image 500 in the positive side or the negative side in the Y axis direction, the electronic device 100 drives the vibrating element 140 to generate the natural vibration in the ultrasound frequency band at the top panel 120 while the input fields 400A1 and 400B1, which are not input, are being displayed on the display panel 160.

This vibration pattern is the vibration pattern P1 for continuously generating, at the top panel 120, the natural vibration in the ultrasound frequency band with a constant amplitude. As a result, a smooth tactile sensation with a low kinetic friction force is provided to the user's fingertip. This tactile sensation is provided by the squeeze effect.

However, when the user further scrolls the image 500, and thereby the input fields 400A1 and 400B1, which are not input, become not displayed on the display panel 160, the electronic device 100 turns off the vibrating element 140. This vibration pattern is the vibration pattern P2 for turning off the vibrating element 140.

As a result, a grippy tactile sensation with a high kinetic friction force is provided to the user's fingertip. In this way, because a tactile sensation at the user's fingertip changes upon the input fields 400A1 and 400B1, which are not input, becoming not displayed on the display panel 160, the user can understand, simply through the tactile sensation, that a deficiency is present in input data.

In this way, the electronic device 100 provides different tactile sensations to the user based on the presence or absence of a deficiency in input data such that the user can determine, from the tactile sensation obtained from the user's fingertip, the presence or absence of a deficiency in input data.

Figure 13:
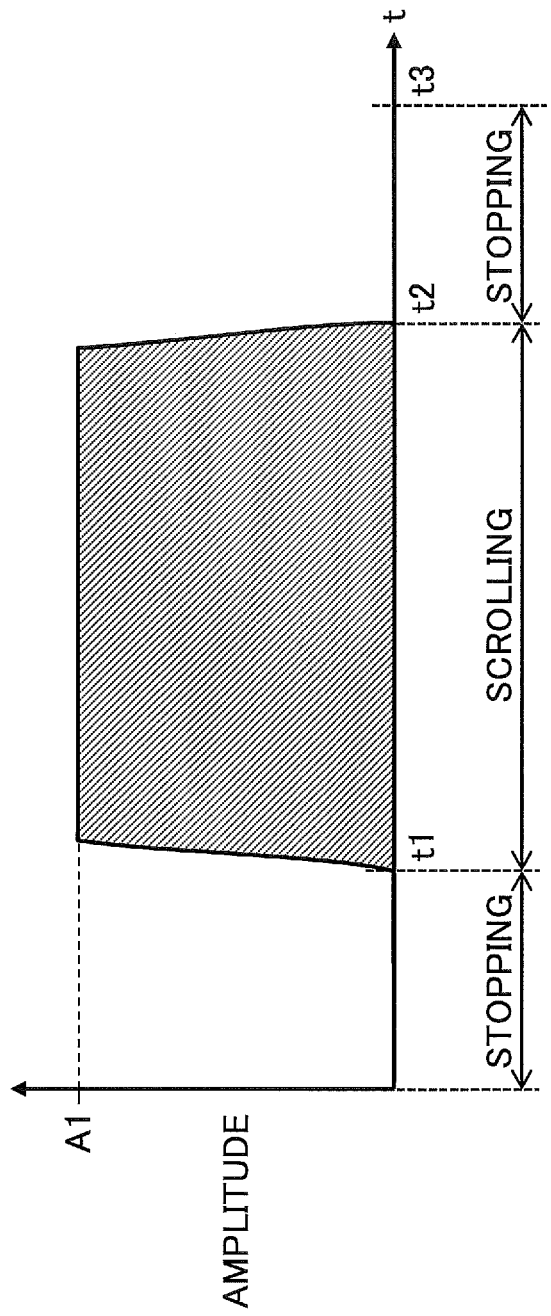
FIG. 13 is a diagram illustrating an operating example of the electronic device of the first embodiment.
Figure 14:
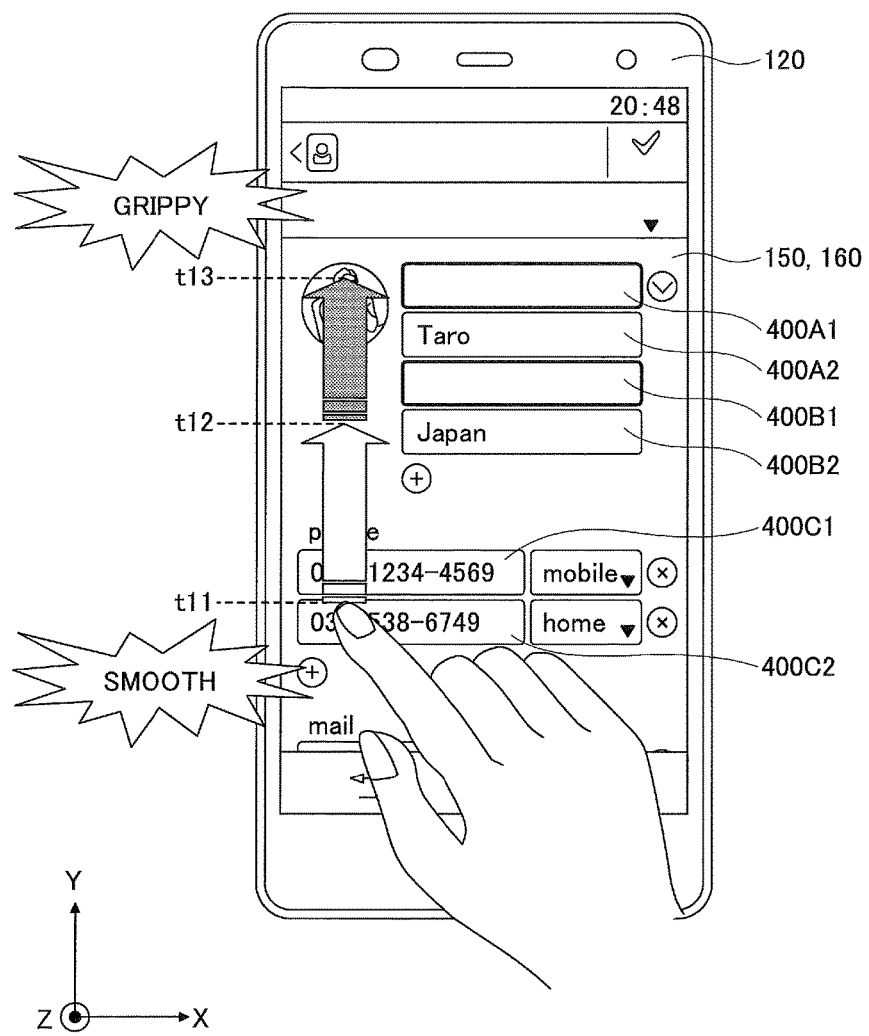
FIG. 14 is a diagram illustrating an operating example of the electronic device of the first embodiment.
Figure 15:
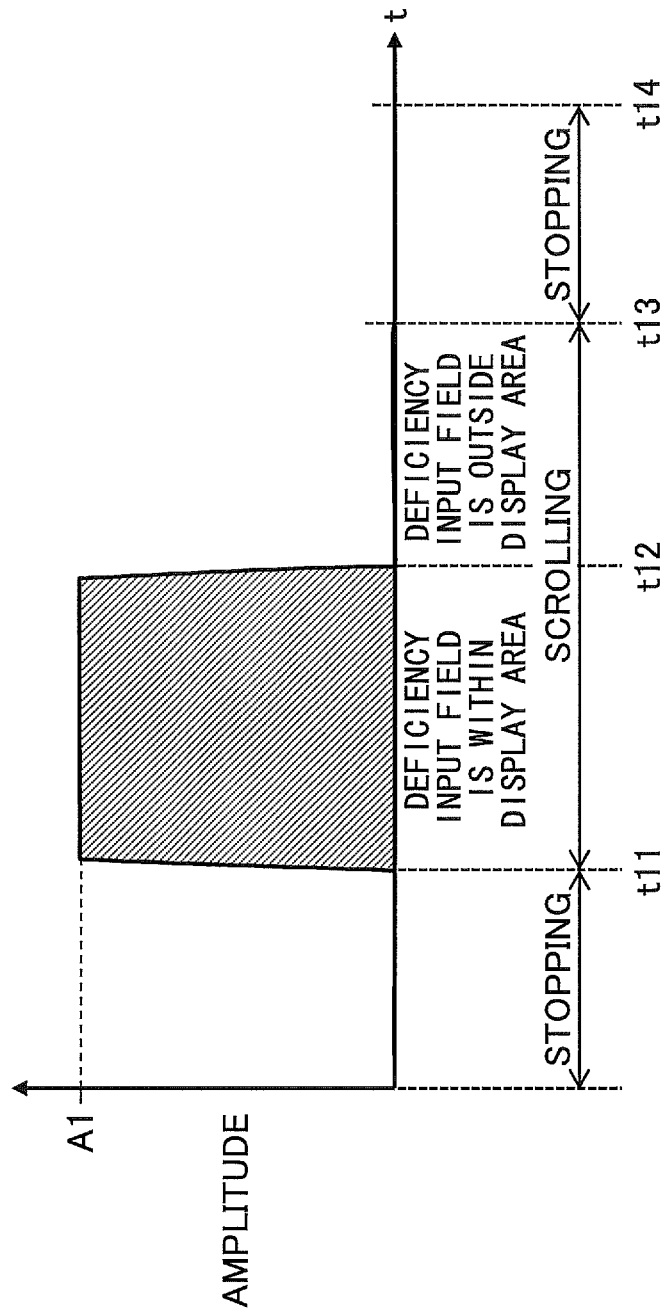
FIG. 15 is a diagram illustrating an operating example of the electronic device of the first embodiment.

FIG. 13 to FIG. 15 are diagrams illustrating operating examples of the electronic device 100 of the first embodiment. Here, in order to report to the user, only by a tactile sensation, the presence or absence of a deficiency in input data, the electronic device 100 drives the vibrating element 140 according to the following vibration patterns.

The vibration pattern illustrated in FIG. 13 corresponds to a case, in which a user performs a scrolling operation in a state in which data is correctly input in the input fields 400A1, 400A2, 400B1, 400B2, 400C1, and 400C2 as illustrated in FIG. 11.

When the user's fingertip touches the top panel 120 at time t1 to start a scrolling operation, the vibrating element 140 is turned on from off by the drive controlling part 240. As a result, the natural vibration in the ultrasound frequency band with the amplitude A1 is generated at the top panel 120.

When the scrolling operation is performed from time t1 to time t2 by the user's fingertip, even when the input fields 400A1, 400A2, 400B1, 400B2, 400C1, and 400C2 become not displayed on the display panel 160, the natural vibration in the ultrasound frequency band of the amplitude A1 is continuously generated at the top panel 120. Then, the user obtains, through the user's fingertip, a smooth tactile sensation with a low friction force. As a result, the user can determine, through the tactile sensation at the user's fingertip, that a deficiency is not present in the data input in the input fields 400A1, 400A2, 400B1, 400B2, 400C1, and 400C2.

When the scrolling operation by the user's fingertip is completed at time t2, the drive controlling part 240 turns off the vibrating element 140. Thus, the amplitude of the top panel 120 becomes zero immediately after time t2. Further, the user can obtain, through the user's fingertip, the tactile sensation of the presence of a convex portion on the surface of the top panel 120, and can recognize that the scrolling of the image 500 is stopped. Note that the user separates the user's fingertip from the top panel 120 at time t3.

Next, a case will be described in which a deficiency is present in input data of the input fields 400A1 and 400B1 with reference to FIG. 14 and FIG. 15. Similar to FIG. 12, FIG. 14 illustrates a state in which the first name (Taro) is input in the input field 400A2 without an input of a last name in the input field 400A1, the country name (Japan) is input in the input field 400B2 without an input of a city name in the input field 400B1, and the mobile phone number and the home phone number are respectively input in the input fields 400C1 and 400C2.

As illustrated in FIG. 14, it is assumed that the user's fingertip touches the top panel 120 at time t11 to start a scrolling operation in the positive side in the Y axis direction, the input field 400A1 becomes not displayed on the display panel 160 at time t12, and the scrolling operation is performed until time t13. In this way, when the scrolling operation is performed in a case where a deficiency is present in input data of the input fields 400A1 and 400B1, the electronic device 100 drives the vibrating element 140 according to a driving pattern illustrated in FIG. 15.

As illustrated in FIG. 15, when the user's fingertip touches the top panel 120 at time t11 to start a scrolling operation, the vibrating element 140 is turned on from off by the drive controlling part 240. As a result the natural vibration in the ultrasound frequency band with the amplitude A1 is generated at the top panel 120.

When the user further performs the scrolling operation on the top panel 120 in the positive side in the Y axis direction such that the input field 400A1 becomes not displayed on the display panel 160 at time t12, the electronic device 100 turns off the vibrating element 140. As a result, a vibration becomes not generated at the top panel 120, and the kinetic friction force applied to the user's fingertip increases. Then, the user can determine that a deficiency is present in the input data of the input field 400A1 through the tactile sensation at the user's fingertip.

It is assumed here that the user further performs the scrolling operation in the positive side in the Y axis direction on the top panel 120 and completes the scrolling operation at time t13. Between time t12 and time t13, the vibrating element 140 is off.

Hence, the user can determine, through the tactile sensation at the user's fingertip, that a deficiency is present in at least input data of the input field 400A1.

The scrolling operation by the user's fingertip is completed at time t13, and the user separates the user's fingertip from the top panel 120 at time t14.

Figure 16:
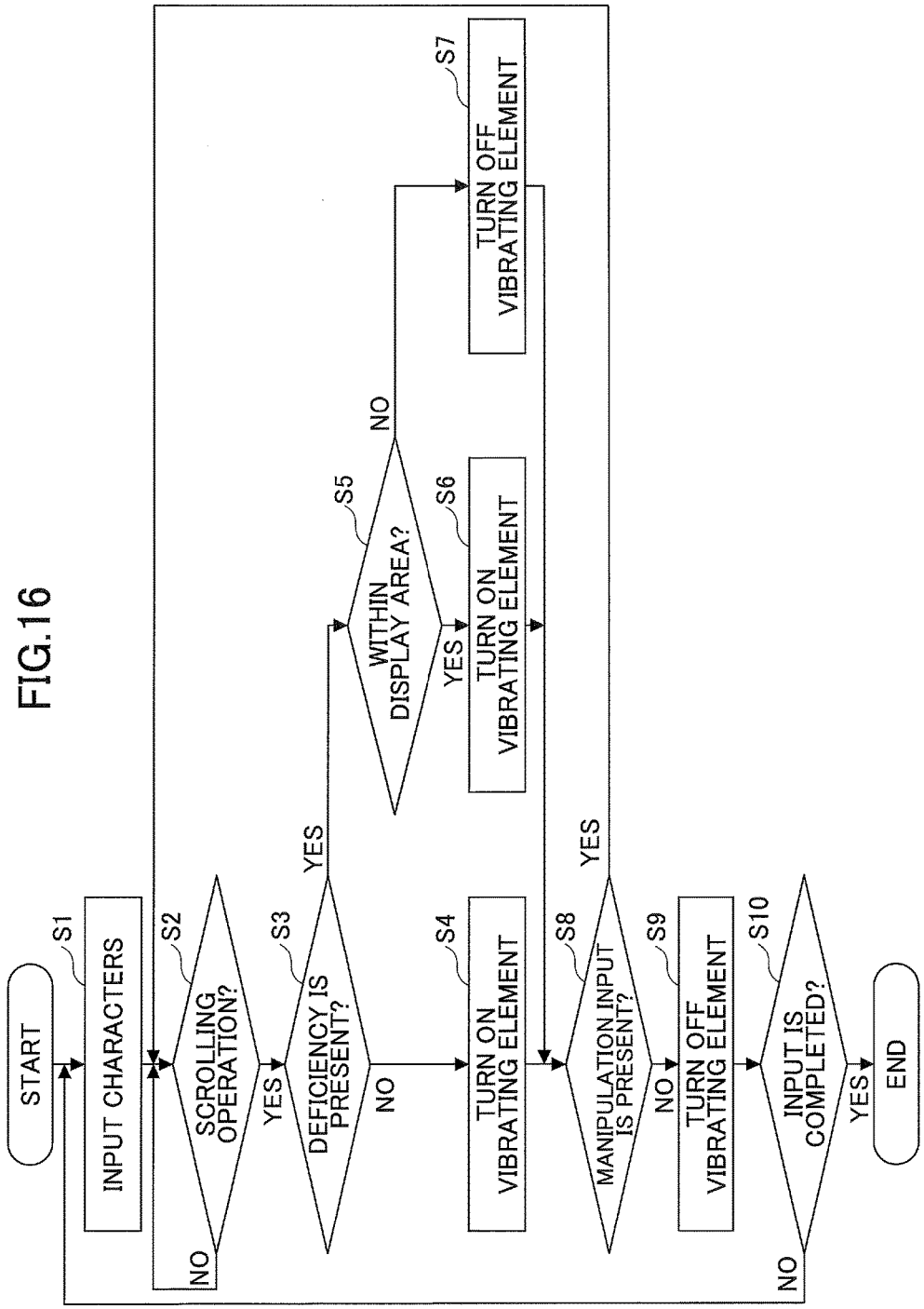
FIG. 16 is a flowchart illustrating a process that is executed by a drive controlling part of the electronic device according to the first embodiment.

FIG. 16 is a flowchart illustrating a process that is executed by the drive controlling apparatus 300 of the electronic device 100 according to the first embodiment.

An operating system (OS) of the electronic device 100 executes control for driving the electronic device 100 every predetermined control cycle. Accordingly, the drive controlling apparatus 300 performs calculation for every predetermined control cycle and repeatedly executes the flow illustrated in FIG. 10 for every predetermined control cycle.

The drive controlling apparatus 300 starts the process when the electronic device 100 is powered on (START).

The drive controlling apparatus 300 recognizes in step S1 that data is input in the input fields 400A1 to 400D2.

After the data is input, the drive controlling apparatus 300 determines whether a scrolling operation is performed in step S2. The drive controlling apparatus 300 may determine whether the scrolling operation is performed based on whether coordinates of a manipulation input are continuously changed. The drive controlling apparatus 300 repeatedly executes the process of step S2 until determining that a scrolling operation is performed.

The drive controlling apparatus 300 determines in step S3 whether a deficiency is present in the input data of the input fields 400A1 to 400D2 included in the image 500.

Note that the drive controlling apparatus 300 may cause the application processor 220 to use a function of the OS to determine whether a deficiency is present in any data input in the input fields 400A1 to 400D2.

Upon determining that a deficiency is not present in all the input data of the input fields 400A1 to 400D2 (NO in step S3), the drive controlling apparatus 300 continuously turns on the vibrating element 140 in step S4. In step S4, even when the input fields 400A1 to 400D2 are not being displayed on the display panel 160, the vibrating element 140 is turned on.

In such a case, in order to reduce the kinetic friction force at the user's fingertip by the squeeze effect and to notify the user that a deficiency is not present in all the input data of the input fields 400A1 to 400D2 through the tactile sensation, the vibrating element 140 is continuously turned on.

Upon determining that a deficiency is present in any input data of the input fields 400A1 to 400D2 (YES in step S3), the drive controlling apparatus 300 causes the flow to proceed to step S5. Here, for example, it is assumed that a deficiency is present in the input data of the input fields 400A1 and 400B1 as illustrated in FIG. 12.

The drive controlling apparatus 300 determines whether the input fields 400A1 and 400B1 are within the display area in step S5.

The drive controlling apparatus 300 may determine whether coordinate data for the input fields 400A1 and 400B1 associated with the application IDs in the data illustrated in FIG. 9 is included in the display area to determine whether the input fields 400A1 and 400B1 are within the display area.

Upon determining that the input fields 400A1 and 400B1 are within the display area (YES in step S5), the drive controlling apparatus 300 continuously turns on the vibrating element 140 in step S6.

Here, when the vibrating element 140 is continuously turned on while the input fields 400A1 and 400B1 with a deficiency in the input data are within the display area, the user cannot recognize that a deficiency is present in the input data at this point of time.

However, for example, there may be a case where the user knows that the input has not been completed and the user is simply changing the positions of the input fields 400A1 and 400B1 within the display area, or a case where the user performs the input to the input fields 400A1 to 400D2 in a random order.

Hence, according to the first embodiment, at the time of proceeding to step S6, the vibrating element 140 is not turned off. That is, the vibrating element 140 is driven according to a vibration pattern the same as that in the case where a deficiency is not present in all the input data.

Upon determining that the input field 400A1 or 400B1 is not within the display area (NO in step S5), the drive controlling apparatus 300 turns off the vibrating element 140 in step S7. This is for reporting, to the user through a change of a tactile sensation, that the input field 400A1 or 400B1, of which the input data has a deficiency, becomes out of the display area (the display panel 160).

Upon completing the process of step S4, S5, or S7, the drive controlling apparatus 300 determines whether a manipulation input is being performed in step S8. The drive controlling apparatus 300 can determine the presence/absence of a manipulation input based on whether the user touches the top panel 120 by the user's fingertip. Therefore, the drive controlling apparatus 300 determines the presence/absence of a manipulation input based on whether the position data is input from the driver IC 151 (FIG. 6).

Upon determining that a manipulation input is being performed (YES in S8), the drive controlling apparatus 300 returns the flow to step S1. This is for continuing the process series to obtain the direction and the position of the scrolling operation in a next control cycle.

Upon determining that a manipulation input is not being performed (NO in step S8), the drive controlling apparatus 300 turns off the vibrating element 140 in step S9. This is because it is not required to drive the vibrating element 140 in a case where a manipulation input is not being performed.

Upon turning off the vibrating element 140 in step S9, the drive controlling apparatus 300 determines whether data has been input in all the input fields 400A1 to 400D2 in step S10. That is, in step S10, the drive controlling apparatus 300 determines whether the input has been completed.

Upon determining that data has not been input in all the input fields 400A1 to 400D2 (NO in step S10), the drive controlling apparatus 300 returns the flow to step S1. This is to repeat the process until the input to all the input fields 400A1 to 400D2 is completed.

Upon determining that data has been input in all the input fields 400A1 to 400D2 (YES in step S10), the drive controlling apparatus 300 completes the process series (END).

As described above, according to the first embodiment, when a scrolling operation is performed on the top panel 120, and the input field 400A1 or 400B1 with a deficiency in the input data becomes out of the display area, a pattern of vibration generated at the top panel 120 is changed. Therefore, the user can know, simply through the tactile sensation at the user's fingertip, that a deficiency is present in the input data.

As described above, according to the first embodiment, it is possible to provide the drive controlling apparatus 300, the electronic device 100, the drive controlling program, and the drive controlling method such that they are user-friendly.

For example, in many cases, in the image 500 for displaying the input fields 400A1 to 400D2 illustrated in FIG. 8, all the input fields are displayed by scrolling a plurality of pages.

When data is input in input fields while such an image is scrolled, there may be many input fields. Then, there is a case in which the image is scrolled without noticing an input miss or an input error and a confirmation button is pushed while believing that all the inputs has been completed. In most of such cases, the input miss or the input error is not noticed until the confirmation button is pushed.

According to such a conventional input support apparatus, in many cases, a user does not notice a deficiency until executing a confirmation operation after entering data to input fields over several pages. Then, an input field with the deficiency is displayed after the confirmation operation, the user is prompted to re-enter data, and the user can become irritated.

In particular, in a case where a display panel is small as in a portable terminal device of recent years, it is difficult to visually confirm that, when data is input in many input fields, the input to all the input fields has been completed.

With respect to the above, the electronic device 100 according to the first embodiment can report, through a tactile sensation to the user, the presence of a deficiency in input data before the input is completed (a confirmation operation is performed). Therefore, the electronic device 100 is very useful.

When the user forgets to input required data in the input fields 400A1 and 400B1 and scrolls the image 500 while the input fields 400A1 and 400B1 with a deficiency in the input data are being displayed in the display area, the user obtains a light scrolling feeling through a tactile sensation with a kinetic friction force reduced by the squeeze effect.

When the user further continues to scroll the image 500, the input fields 400A1 and 400B1 with a deficiency in the input data become out of the display area. From this point of time, the user can sense an increase of the kinetic friction force applied to the user's fingertip and can understand, simply through a tactile sensation, that some kind of input error has occured.

Accordingly, without depending on visual information, the user can grasp an input error before completing all input operations. Therefore, the user can perform favorable input operations.

Note that although the image 500 cannot be scrolled in the U axis direction but can be scrolled only in the V axis direction in the embodiment described above, alternatively, the image 500 may be scrollable in both the U axis direction and the V axis direction. Additionally, the image 500 may be scrollable only in the U axis direction.

Further, the electronic device 100 of the embodiment generates the driving signal by causing the amplitude modulator 320 to modulate only the amplitude of the sinusoidal wave, which is in the ultrasound frequency band, generated by the sinusoidal wave generator 310. The frequency of the sinusoidal wave in the ultrasound frequency band generated by the sinusoidal wave generator 310 is equal to the natural vibration frequency of the top panel 120. Further, this natural vibration frequency is set in consideration of the vibrating element 140.

That is, the driving signal is generated by the amplitude modulator 320 modulating only the amplitude of the sinusoidal wave in the ultrasound frequency band generated by the sinusoidal wave generator 310, without modulating the frequency or the phase of the sinusoidal wave.

Accordingly, it becomes possible to generate, at the top panel 120, the natural vibration in the ultrasound frequency band of the top panel 120 and to decrease with certainty the kinetic friction coefficient applied to the user's finger tracing the surface of the top panel 120 by utilizing the layer of air provided by the squeeze effect. Further, it becomes possible to provide a favorable tactile sensation to the user as if a concavo-convex portion were present on the surface of the top panel 120 by utilizing the Sticky-band Illusion effect.

In the embodiment described above, in order to provide the tactile sensations to the user as if concave-convex portions were present on the top panel 120, the vibrating element 140 is switched on/off. Turning off the vibrating element 140 is equal to setting the amplitude value, represented by the driving signal used to drive the vibrating element 140, to be zero.

However, it is not necessary to turn the vibrating element 140 from on to off in order to provide such tactile sensations. For example, the vibrating element 140 may be driven to decrease the amplitude instead of turning off the vibrating element 140. For example, similar to turning the vibrating element 140 from on to off, the tactile sensation may be provided to the user as if a concave-convex portion were present on the top panel 120 by decreasing the amplitude to approximately one-fifth.

In this case, the vibrating element 140 is driven by the driving signal such that the intensity of the vibration of the vibrating element 140 is changed. As a result, the intensity of the natural vibration generated at the top panel 120 is changed, and it becomes possible to provide the tactile sensation to the user's fingertip as if a concavo-convex portion were present.

When the vibrating element 140 is turned off to weaken the vibration in order to change the intensity of the vibration of the vibrating element 140, on/off of the vibrating element 140 is switched. Switching on/off the vibrating element 140 means driving the vibrating element 140 intermittently.

A perception experiment was performed for approximately 1000 persons to operate the electronic device 100. It was found that every person tested was able to feel a concavo-convex feeling. Further, although it is said that a resolution ability of humans to perceptually distinguish two types of tactile sensations such as concavity and convexity is by approximately intervals of 10 ms to 100 ms, the persons tested could sufficiently sense the two even when the amplitude of the natural vibration in the ultrasound frequency band was switched on/off at an interval less than or equal to 100 ms. From the above, it was clear that a resolution ability as high as a perceptual resolution ability of humans could be expressed.

Second Embodiment

A second embodiment is for causing the electronic device 100 of the first embodiment to perform operations that differ from those of the first embodiment. Hence, in the second embodiment, the electronic device 100 of the first embodiment is used to describe the operations.

FIG. 17 to FIG. 20 are diagrams illustrating operating examples of the electronic device 100 of the first embodiment. Here, in order to report to the user, only by a tactile sensation, the presence or absence of a deficiency in input data, the electronic device 100 drives the vibrating element 140 according to the following vibration patterns.

Figure 17:
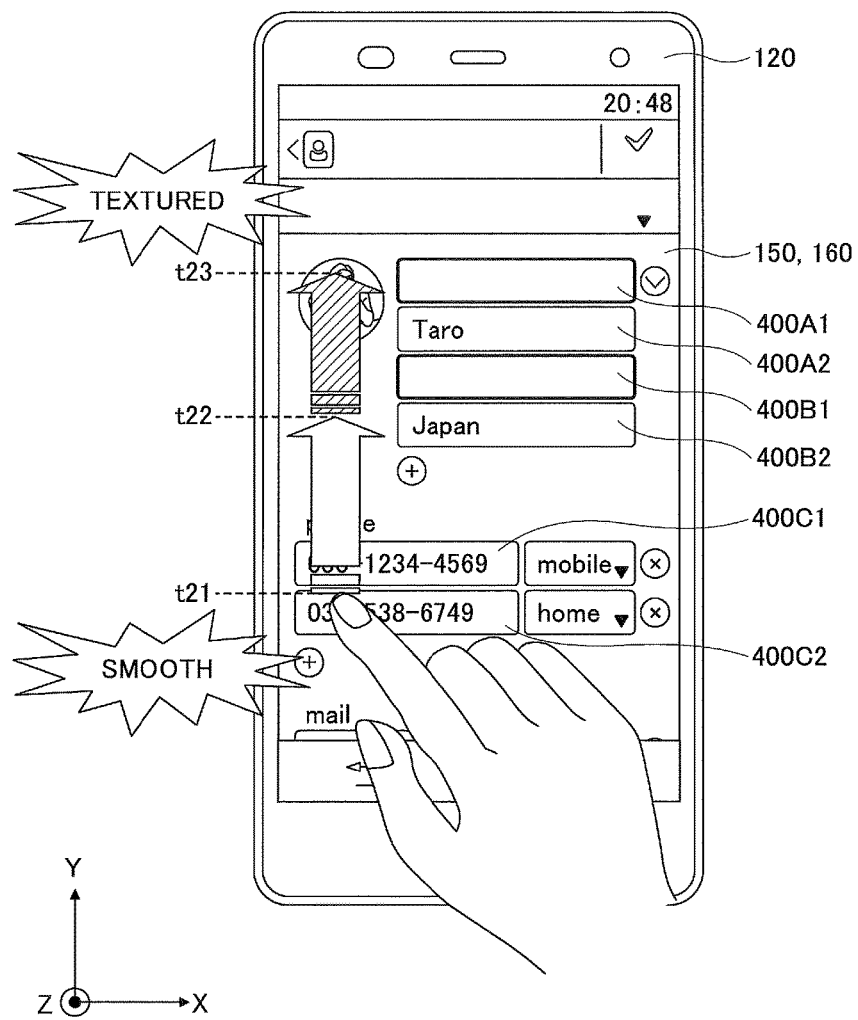
FIG. 17 is a diagram illustrating an operating example of the electronic device according to a second embodiment.

As illustrated in FIG. 17, it is assumed that the user's fingertip touches the top panel 120 at time t21 to start a scrolling operation in the positive side in the Y axis direction. Subsequently, while the image 500 is scrolled, the input field 400A1 becomes not displayed on the display panel 160 at time t22, and the scrolling operation is performed until time t23. In this way, when the scrolling operation is performed in a case where a deficiency is present in input data of the input fields 400A1 and 400B1, the electronic device 100 drives the vibrating element 140 according to a driving pattern illustrated in FIG. 18.

Figure 18:
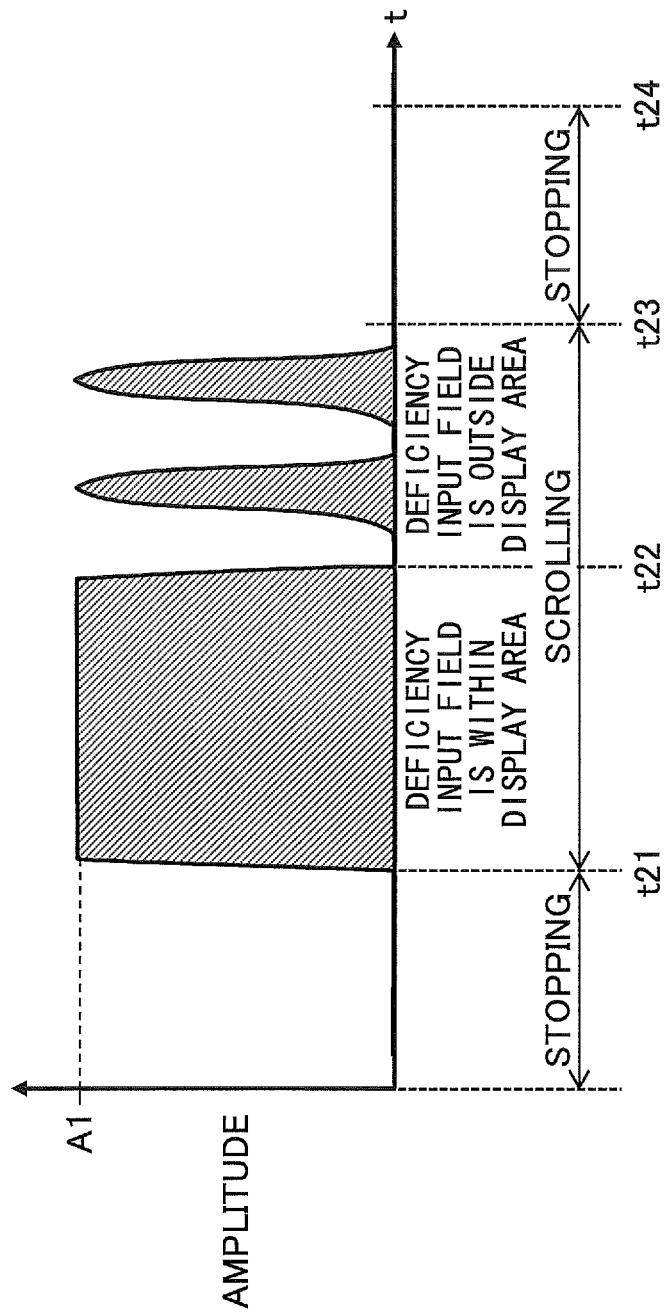
FIG. 18 is a diagram illustrating an operating example of the electronic device according to the second embodiment.

As illustrated in FIG. 18, when the user's fingertip touches the top panel 120 at time t21 to start a scrolling operation, the vibrating element 140 is turned on from off by the drive controlling part 240. As a result the natural vibration in the ultrasound frequency band with the amplitude A1 is generated at the top panel 120.

When the user further performs the scrolling operation on the top panel 120 in the positive side in the Y axis direction such that the input field 400A1 becomes not displayed on the display panel 160 at time t12, the electronic device 100 repeatedly turns on and off the vibrating element 140 at short cycles.

As a result, an intermittent natural vibration in the ultrasound frequency band of the amplitude A1 is generated at short cycles at the top panel 120, and the user feels a click feeling through the user's fingertip. As a result, the user can determine, through the tactile sensation at the user's fingertip, that a deficiency is present in the input data.

It is assumed here that the user further performs the scrolling operation in the positive side in the Y axis direction on the top panel 120 and completes the scrolling operation at time t23. At time t23, the electronic device 100 turns off the vibrating element 140. As a result, it enters a state where vibration is not generated at the top panel 120.

The scrolling operation by the user's fingertip is completed at time t23, and the user separates the user's fingertip from the top panel 120 at time t24.

In this way, when the input field 400A1 with a deficiency in the input data becomes not displayed on the display panel 160, the vibration pattern for continuously turning on the vibrating element 140 may be switched to the vibration pattern for repeatedly turning on and off the vibrating element 140 at short cycles. Thereby, through changing the tactile sensation, the presence of a deficiency in the input data can be reported to the user.

Figure 19:
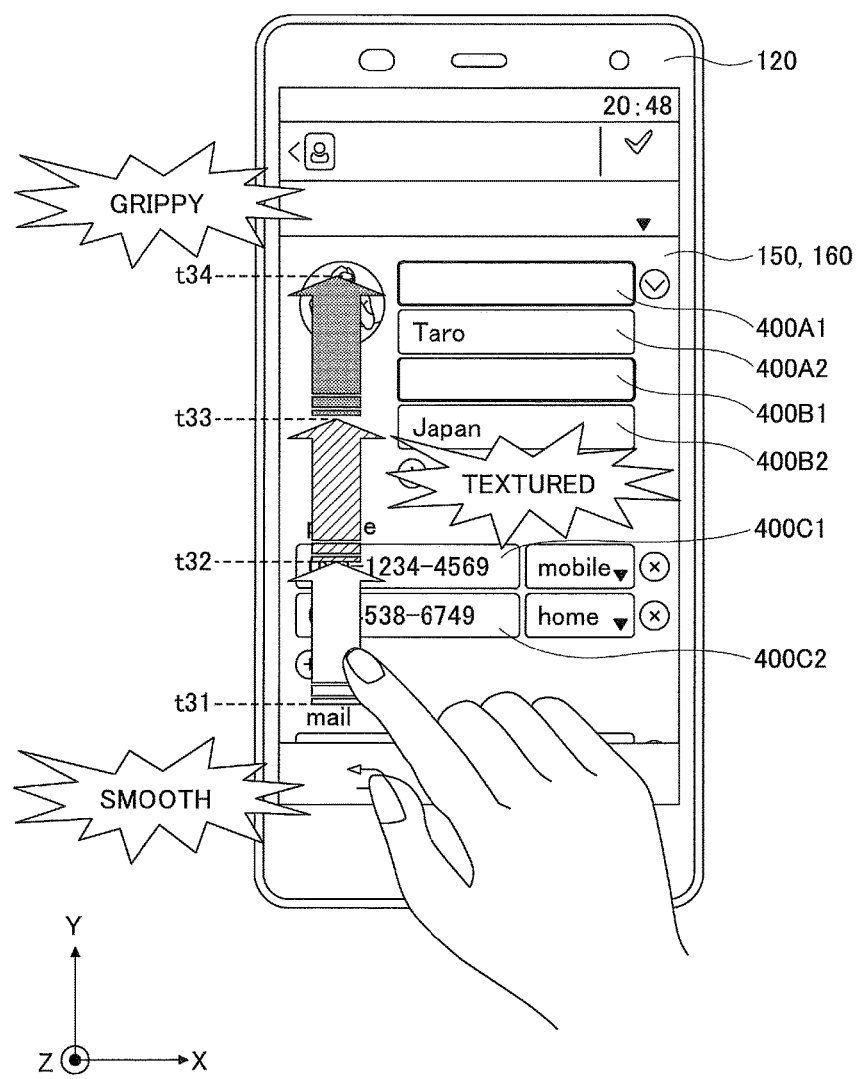
FIG. 19 is a diagram illustrating an operating example of the electronic device according to the second embodiment.

As illustrated in FIG. 19, it is assumed that the user's fingertip touches the top panel 120 at time t31 to start a scrolling operation in the positive side in the Y axis direction. Subsequently, while the image 500 is scrolled, the input field 400A1 approaches the positive side edge of the display panel 160 in the Y axis direction at time t32, the input field 400A1 becomes not displayed on the display panel 160 at time t33, and the scrolling operation is performed until time t34.

Figure 20:
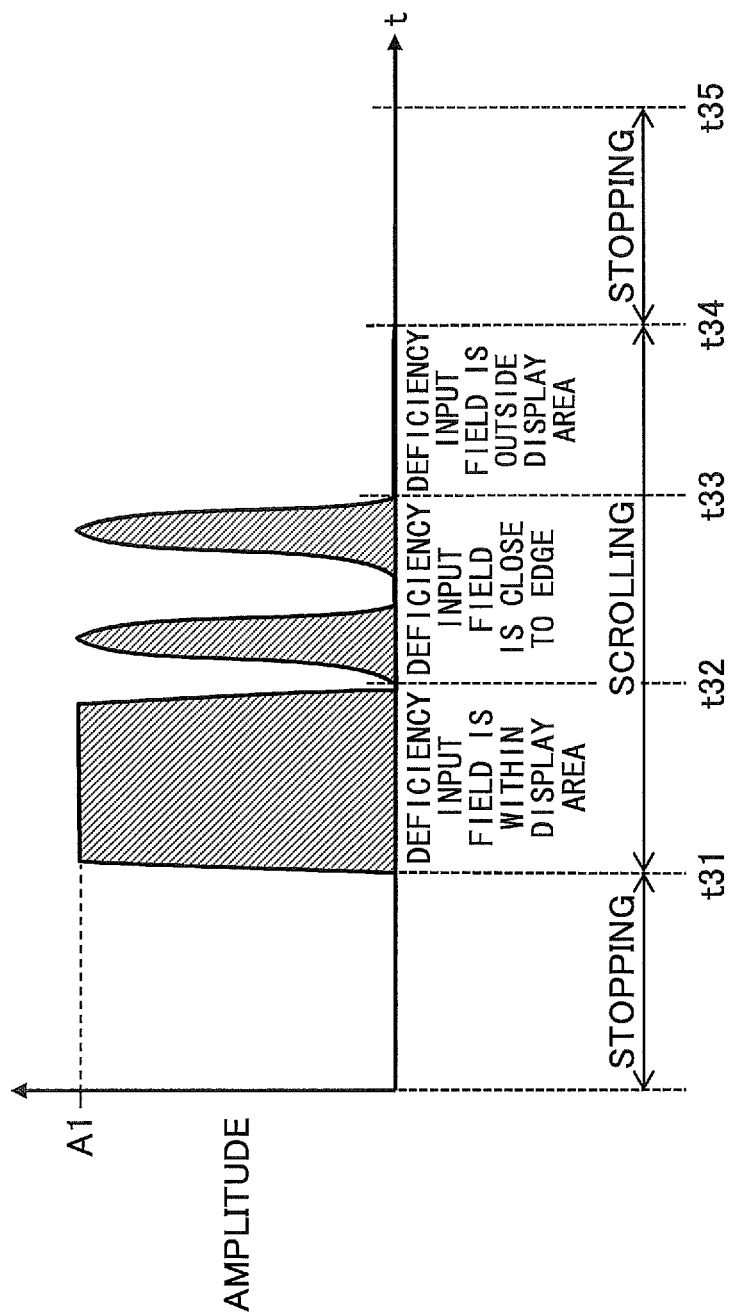
FIG. 20 is a diagram illustrating an operating example of the electronic device according to the second embodiment.

In this way, when the scrolling operation is performed in a case where a deficiency is present in input data of the input fields 400A1 and 400B1, the electronic device 100 drives the vibrating element 140 according to a driving pattern illustrated in FIG. 20.

As illustrated in FIG. 20, when the user's fingertip touches the top panel 120 at time t31 to start a scrolling operation, the vibrating element 140 is turned on from off by the drive controlling part 240. As a result the natural vibration in the ultrasound frequency band with the amplitude A1 is generated at the top panel 120.

When the user further performs the scrolling operation on the top panel 120 in the positive side in the Y axis direction such that the input field 400A1 approaches the positive side edge of the display panel 160 in the Y axis direction at time t32, the electronic device 100 repeatedly turns on and off the vibrating element 140 at short cycles.

As a result, an intermittent natural vibration in the ultrasound frequency band of the amplitude A1 is generated at short cycles at the top panel 120, and the user feels a click feeling through the user's fingertip. As a result, the user can determine, through the tactile sensation at the user's fingertip, that a deficiency is present in the input data.

Note that it may be determined that the input field 400A1 approaches the positive side edge of the display panel 160 in the Y axis direction by determining whether the input field 400A1 enters within an area having a predetermined length from the positive side edge of the display area in the V axis direction towards the negative side in the V axis direction, based on coordinate values of the UV coordinate system.

Here, when the user further performs the scrolling operation in the positive side in the Y axis direction on the top panel 120, and when the input field 400A1 becomes not displayed on the display panel 160 at time t33, the electronic device 100 turns off the vibrating element 140. As a result, the amplitude becomes zero and thus entering a state where vibration is not generated at the top panel 120.

The scrolling operation by the user's fingertip is completed at time t34, and the user separates the user's fingertip from the top panel 120 at time t35.

In this way, when the input field 400A1 with a deficiency in the input data approaches the positive side edge of the display panel 160 in the Y axis direction, the vibration pattern for continuously turning on the vibrating element 140 may be switched to the vibration pattern for repeatedly turning on and off the vibrating element 140 at short cycles. Thereby, through changing the tactile sensation, the presence of a deficiency in the input data can be reported to the user.

As described above, according to the second embodiment, it is possible to provide the drive controlling apparatus 300, the electronic device 100, the drive controlling program, and the drive controlling method such that they are user-friendly.

Note that when the direction of the scrolling operation is changed from the positive side in the Y axis direction to the negative side in the Y axis direction before the input field 400A1 becomes not displayed in the display panel 160 (the display area) at time t33 illustrated in FIG. 19 and FIG. 20, the electronic device 100 may turn on the vibrating element 140 with the amplitude A1.

Because the input field 400A1 returns from the edge area to the central area of the display panel 160, a smooth tactile sensation with a low kinetic friction force is used to provide a tactile sensation such that the input field 400A1 easily returns to the central area of the display panel 160.

Here, variation examples of the electronic device 100 of the first and second embodiments will be described with reference to FIG. 21 to FIG. 24.

Figure 21:
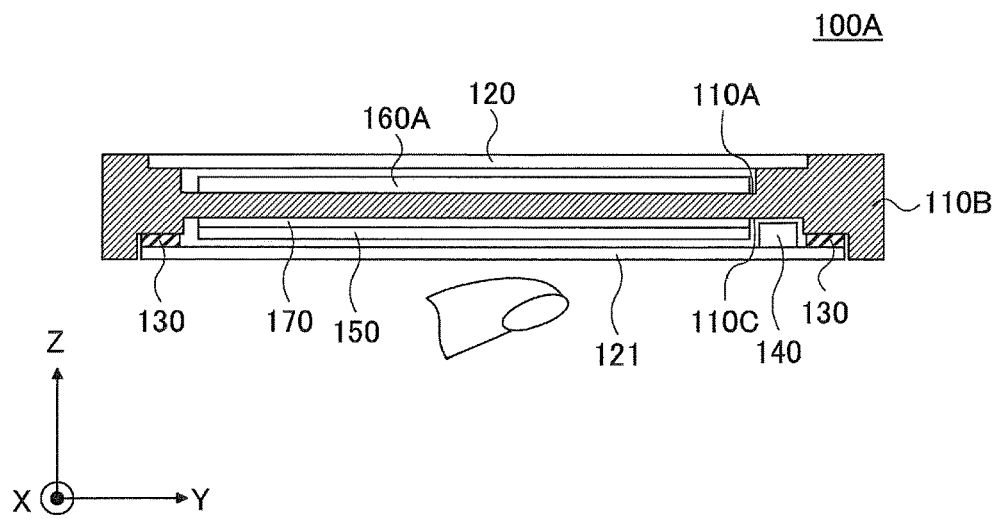
FIG. 21 is a diagram illustrating a cross section of an electronic device according to a variation example of the first and second embodiments.

FIG. 21 is a diagram illustrating a cross section of an electronic device 100A according to a variation example. The cross section illustrated in FIG. 21 corresponds to the cross section taken along the line A-A as illustrated in FIG. 3. In FIG. 21, an XYZ coordinate system, which is an orthogonal coordinate system, similar to that illustrated in FIG. 3 is defined.

The electronic device 100A includes a housing 110B, the top panel 120, a top panel 121, the double-faced adhesive tape 130, the vibrating element 140, the touch panel 150, a display panel 160A, and the substrate 170.

The electronic device 100A has a configuration in which the touch panel 150 of the electronic device 100 illustrated in FIG. 3 is provided on the back face side (the negative side in the Z axis direction). Thus, in comparison with the electronic device 100 illustrated in FIG. 3, the double-faced adhesive tape 130, the vibrating element 140, the touch panel 150, and the substrate 170 are disposed on the back face side.

A recessed portion 110A at the positive side in the Z axis direction and a recessed portion 110C at the negative side in the Z axis direction are formed on the housing 110B. The display panel 160A is disposed inside the recessed portion 110A and is covered with the top panel 120. The substrate 170 and the touch panel 150 are stacked and disposed inside the recessed portion 110C. The top panel 121 is secured to the housing 110B with the double-faced adhesive tape 130. The vibrating element 140 is disposed on a positive side surface of the top panel 121 in the Z axis direction.

When on/off of the vibrating element 140 is switched to generate the natural vibration in the ultrasound frequency band at the top panel 121 in accordance with a manipulation input performed on the top panel 121 in the electronic device 100A illustrated in FIG. 21, in a way similar to that of the electronic device 100 illustrated in FIG. 3, the electronic device 100A with which a user can sense tactile sensations corresponding to an image displayed on the display panel 160A through the user's fingertip can be provided.

Although FIG. 21 illustrates the electronic device 100A in which the touch panel 150 is provided at the back surface side, the touch panel 150 may be provided for each of the front surface side and the back surface side by combining the structure illustrated in FIG. 3 and the structure illustrated in FIG. 21.

Figure 22:
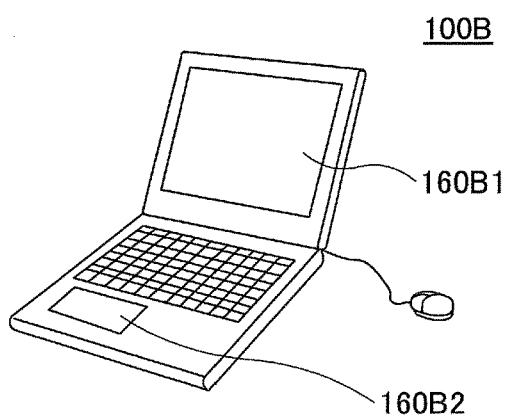
FIG. 22 is a diagram illustrating an electronic device of a variation example of the first and second embodiments.

FIG. 22 is a diagram illustrating an electronic device 100B of a variation example. The electronic device 100B is a notebook Personal Computer (PC).

The PC 100B includes a display panel 160B1 and a touch pad 160B2.

Figure 23:
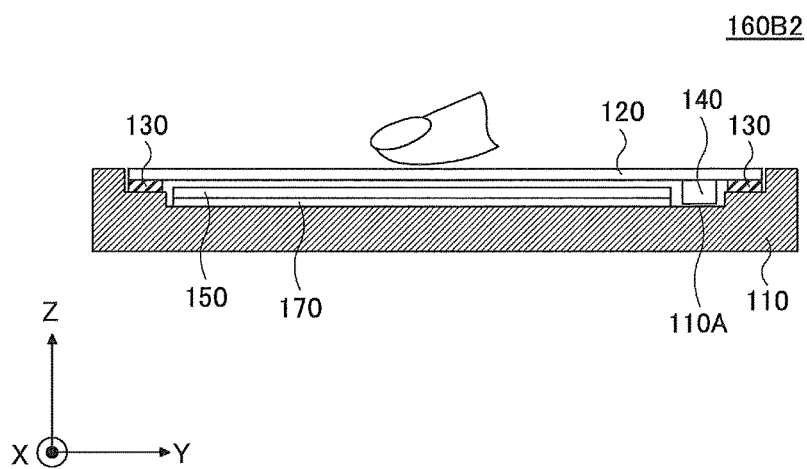
FIG. 23 is a diagram illustrating a cross section of a touch pad of the electronic device of the variation example of the first and second embodiments.
Figure 24:
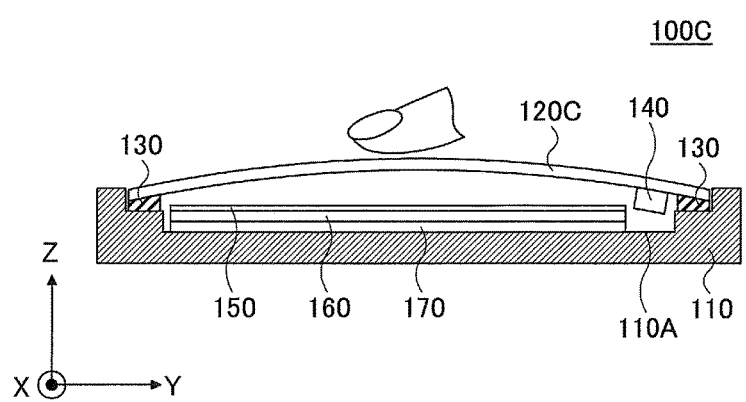
FIG. 24 is a plan view illustrating an operating state of an electronic device of a variation example of the first and second embodiments.

FIG. 23 is a diagram illustrating a cross section of the touch pad 160B2 of the electronic device 100B of the variation example. The cross section illustrated in FIG. 23 corresponds to the cross section taken along the line A-A as illustrated in FIG. 3. In FIG. 24, an XYZ coordinate system, which is an orthogonal coordinate system, similar to that illustrated in FIG. 3 is defined.

The touch pad 160B2 has a configuration in which the display panel 160 is omitted from the electronic device 100 illustrated in FIG. 3.

By switching on/off the vibrating element 140 to generate the natural vibration in the ultrasound frequency band at the top panel 120 in accordance with a manipulation input performed on the touch pad 160B2 in the electronic device 100B as a PC as illustrated in FIG. 22, in a way similar to that of the electronic device 100 illustrated in FIG. 3, an operational feeling can be provided to the user's fingertip through tactile sensations in accordance with an amount of movement of the manipulation input performed on the touch pad 160B2.

Further, by providing the vibrating element 140 at the back surface of the display panel 160B1, in a way similar to that of the electronic device 100 illustrated in FIG. 3, an operational feeling can be provided to the user's fingertip through tactile sensations in accordance with an amount of movement of the manipulation input performed on the display panel 160B1. In this case, the electronic device 100 illustrated in FIG. 3 may be provided instead of the display panel 160B1.

FIG. 24 is a plan view illustrating an operating state of an electronic device 100C of a variation example.

The electronic device 100C includes the housing 110, a top panel 120C, the double-faced adhesive tape 130, the vibrating element 140, the touch panel 150, the display panel 160 and the substrate 170.

Except for the top panel 120C which is a curved glass, the electronic device 100C illustrated in FIG. 24 has a configuration similar to that of the electronic device 100 of the first embodiment illustrated in FIG. 3.

The top panel 120C is curved such that its center portion protrudes towards a positive side in the Z axis direction. Although FIG. 24 illustrates a cross sectional shape of the top panel 120C in the YZ plane, a cross sectional shape in a XZ plane is similar to the cross sectional shape in the YZ plane.

In this way, it is possible to provide favorable tactile sensations by using the top panel 120C of the curved glass. In particular, it is effective for a case where a shape of an actual object to be displayed as an image is curved.

Although examples of a drive controlling apparatus, an electronic device, a drive controlling program, and a drive controlling method according to the embodiments of the present invention have been described above, the present invention is not limited to the embodiments specifically disclosed and various variations and modifications may be made without departing from the scope of the present invention.

All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the spirit and scope of the invention.

What is claimed is:

1. A drive controlling apparatus for driving a vibrator of an electronic device, the electronic device including a display part, a top panel disposed on a display surface side of the display part and having a manipulation surface, a coordinate detector configured to detect coordinates of a manipulation input performed on the manipulation surface, and the vibrator, which is configured to generate a vibration at the manipulation surface, the drive controlling apparatus comprising:
a memory configured to store image data for a scrollable image, to be displayed on the display part and including an input field for inputting predetermined information, in association with position data that represents a position of the input field in the image and in association with input data input in the input field;
a processor that is coupled to the memory and that is configured to:
calculate, based on the coordinates detected by the coordinate detector, an operation amount and an operation direction of a scrolling operation performed on the manipulation surface;
determine presence or absence of a deficiency in the input data input in the input field; and
drive, upon and during the scrolling operation being performed on the top panel, the vibrator by using a driving signal for generating a vibration at a natural frequency in an ultrasound frequency band at the manipulation surface, the processor being configured, based on the operation amount and the operation direction of the scrolling operation, on the presence or absence of the deficiency, and on the position data, to drive the vibrator according to a first pattern when the input field without the deficiency is being displayed on the display part, to drive the vibrator according to the first pattern when the input field with the deficiency is being displayed on the display part, and to drive the vibrator to switch to a second pattern from the first pattern when the input field with the deficiency is scrolled off the display part.

2. The drive controlling apparatus according to claim 1, wherein the processor drives the vibrator such that an intensity of the vibration at the natural frequency according to the first pattern is stronger than an intensity of the vibration at the natural frequency according to the second pattern.

3. The drive controlling apparatus according to claim 2, wherein the first pattern is a driving pattern that maintains the intensity of the vibration at the natural frequency at a predetermined intensity such that a squeeze effect is obtained at the top panel.

4. The drive controlling apparatus according to claim 2, wherein, when the input field with the deficiency becomes out of a display area of the display part, the second pattern is a driving pattern that decreases the intensity of the vibration at the natural frequency relative to the first pattern or is a driving pattern that intermittently weakens the intensity of the vibration at the natural frequency relative to the intensity of the vibration at the natural frequency of the first pattern.

5. The drive controlling apparatus according to claim 1, wherein the processor drives the vibrator according to a third pattern when the input field with the deficiency is being displayed on the display part.

6. The drive controlling apparatus according to claim 5, wherein the third pattern is a driving pattern that maintains an intensity of the vibration at the natural frequency at a predetermined intensity such that a squeeze effect is obtained at the top panel.

7. The drive controlling apparatus according to claim 5, wherein, when the input field with the deficiency approaches an edge area from a central area of the display part, the third pattern is a driving pattern that decreases an intensity of the vibration at the natural frequency or is a driving pattern that intermittently weakens an intensity of the vibration at the natural frequency.

8. The drive controlling apparatus according to claim 5, wherein, when the input field with the deficiency approaches a central area from an edge area of the display part, the third pattern is a driving pattern that increases an intensity of the vibration at the natural frequency.

9. The drive controlling apparatus according to claim 1, wherein the deficiency is that the input data is not present in the input field.

10. The drive controlling apparatus according to claim 1, wherein the deficiency is an error of a content of the input data input in the input field.

11. The drive controlling apparatus according to claim 10, wherein the error is an error of a number of characters or a character type of the input data.

12. An electronic device comprising:
the display part;
the top panel disposed on the display surface side of the display part and having the manipulation surface;
the coordinate detector configured to detect the coordinates of the manipulation input performed on the manipulation surface;
the vibrator configured to generate the vibration at the manipulation surface; and
the drive controlling apparatus according to claim 1.

13. A non-transitory recording medium having stored therein a drive controlling program for driving a vibrator of an electronic device, the electronic device including a display part; a top panel disposed on a display surface side of the display part and having a manipulation surface; a coordinate detector configured to detect coordinates of a manipulation input performed on the manipulation surface; and the vibrator, which is configured to vibrate the manipulation surface, the drive controlling program causing a computer including a memory to execute a process, the memory storing image data for a scrollable image, to be displayed on the display part and including an input field for inputting predetermined information, in association with position data that represents a position of the input field in the image and in association with input data input in the input field, the process comprising:
calculating, based on the coordinates detected by the coordinate detector, an operation amount and an operation direction of a scrolling operation performed on the manipulation surface;
determining presence or absence of a deficiency in the input data input in the input field; and
driving, upon and during the scrolling operation being performed on the top panel, the vibrator by using a driving signal for generating a vibration at a natural frequency in an ultrasound frequency band at the manipulation surface, based on the operation amount and the operation direction of the scrolling operation that are calculated by the calculating, on the presence or absence of the deficiency that is determined by the determining, and on the position data, to drive the vibrator according to a first pattern when the input field without the deficiency is being displayed on the display part, to drive the vibrator according to the first pattern when the input field with the deficiency is being displayed on the display part, and to drive the vibrator to switch to a second pattern from the first pattern when the input field with the deficiency is scrolled off the display part.

14. A drive controlling method for driving a vibrator of an electronic device, the electronic device including a display part; a top panel disposed on a display surface side of the display part and having a manipulation surface; a coordinate detector configured to detect coordinates of a manipulation input performed on the manipulation surface; and the vibrator, which is configured to generate a vibration at the manipulation surface, the drive controlling method being executed by a computer including a memory storing image data for a scrollable image, to be displayed on the display part and including an input field for inputting predetermined information, in association with position data that represents a position of the input field in the image and in association with input data input in the input field, the drive controlling method comprising:
calculating, based on the coordinates detected by the coordinate detector, an operation amount and an operation direction of a scrolling operation performed on the manipulation surface;
determining presence or absence of a deficiency in the input data input in the input field; and
driving, upon and during the scrolling operation being performed on the top panel, the vibrator by using a driving signal for generating a vibration at a natural frequency in an ultrasound frequency band at the manipulation surface, based on the operation amount and the operation direction of the scrolling operation that are calculated by the calculating, on the presence or absence of the deficiency that is determined by the determining, and on the position data, to drive the vibrator according to a first pattern when the input field without the deficiency is being displayed on the display part, to drive the vibrator according to the first pattern when the input field with the deficiency is being displayed on the display part, and to drive the vibrator to switch to a second pattern from the first pattern when the input field with the deficiency is scrolled off the display part.

* * * * *